United States Patent
Ke et al.

(10) Patent No.: US 10,707,560 B1
(45) Date of Patent: Jul. 7, 2020

(54) DISPLAY PANEL STRUCTURE FOR WIRELESS COMMUNICATION WITH ANTENNA ON SIDE SURFACE

(71) Applicant: a.u. Vista, Inc., Irvine, CA (US)

(72) Inventors: Tsung-Ying Ke, Hsinchu (TW);
Chun-Hsin Liu, Hsinchu (TW);
Chih-Hsiang Yang, Hsinchu (TW);
Hung-Chieh Hung, Hsinchu (TW)

(73) Assignee: A.U. VISTA, INC., Milpitas, CA (US)

( * ) Notice: Subject to any disclaimer, the term of this patent is extended or adjusted under 35 U.S.C. 154(b) by 0 days.

(21) Appl. No.: 16/394,383

(22) Filed: Apr. 25, 2019

(51) Int. Cl.
*H01Q 1/24* (2006.01)
*H01P 1/08* (2006.01)
*H04M 1/02* (2006.01)
*H01Q 1/52* (2006.01)
*H01Q 9/04* (2006.01)

(52) U.S. Cl.
CPC .............. *H01Q 1/243* (2013.01); *H01P 1/08* (2013.01); *H01Q 1/526* (2013.01); *H01Q 9/0407* (2013.01); *H04M 1/0266* (2013.01)

(58) Field of Classification Search
CPC ............ H04M 1/0266; H04M 1/0277; H04M 2250/16; H04M 11/00; H04M 1/0268; H01P 1/08; H04W 4/80; H04W 4/06; H04W 4/48; H04W 12/08; H04W 4/029; H04W 88/06
See application file for complete search history.

(56) References Cited

U.S. PATENT DOCUMENTS

| 9,131,037 B2 | 9/2015 | Corbin et al. |
| 2016/0099130 A1* | 4/2016 | Ando .............. H01J 37/3211 315/111.21 |
| 2019/0165822 A1* | 5/2019 | Chen ................. H04B 1/12 |
| 2019/0346946 A1* | 11/2019 | Chai .................. H01Q 1/44 |
| 2019/0386387 A1* | 12/2019 | Kim .................... H01Q 1/36 |

FOREIGN PATENT DOCUMENTS

| TW | 201712493 A | 4/2017 |
| TW | I587568 B | 6/2017 |

* cited by examiner

*Primary Examiner* — Diane D Mizrahi
(74) *Attorney, Agent, or Firm* — Tim Tingkang Xia, Esq.; Locke Lord LLP

(57) ABSTRACT

A display device structure includes a back film, a display panel attached on the back film, and at least one antenna. The display panel defines a central area and a peripheral area on the back film. The antenna may be a 5G antenna, and is disposed on the peripheral area of the back film. The peripheral area of the back film is folded toward a back side of the display device structure. The display device may be disposed in a housing, which has a dielectric window located at a side surface thereof, such that each of the at least one antenna disposed on the folded peripheral area directly faces the dielectric window.

16 Claims, 23 Drawing Sheets

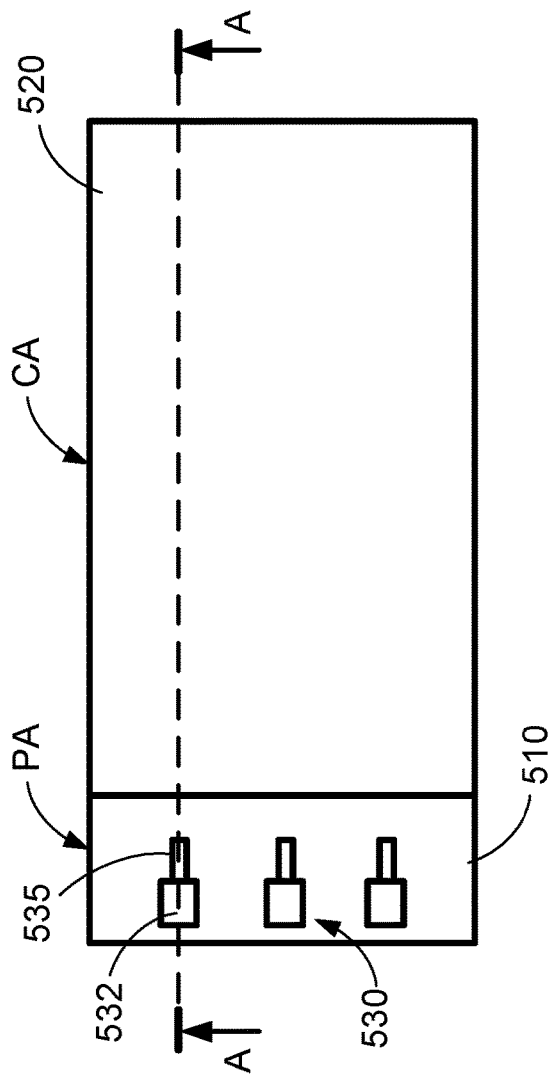
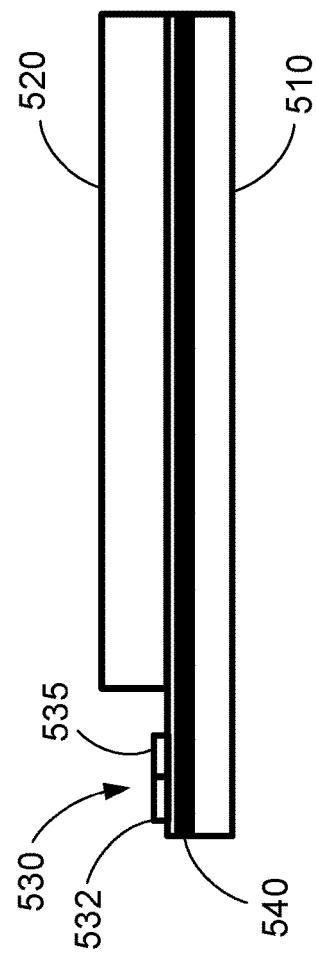
FIG. 5A
FIG. 5B

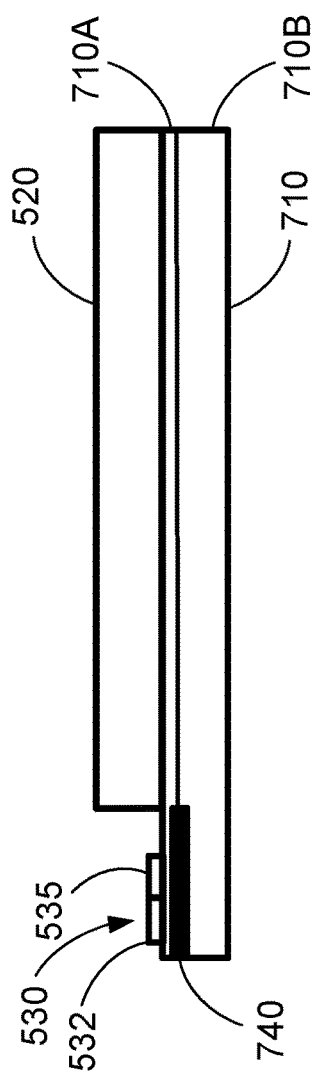
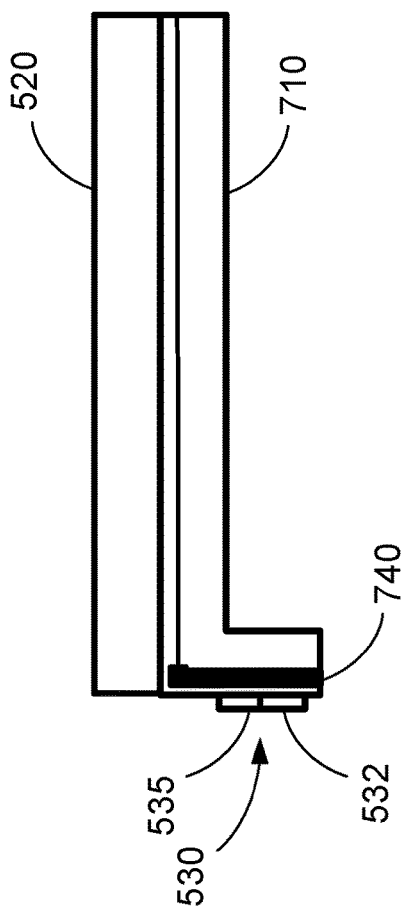
FIG. 7A
FIG. 7B

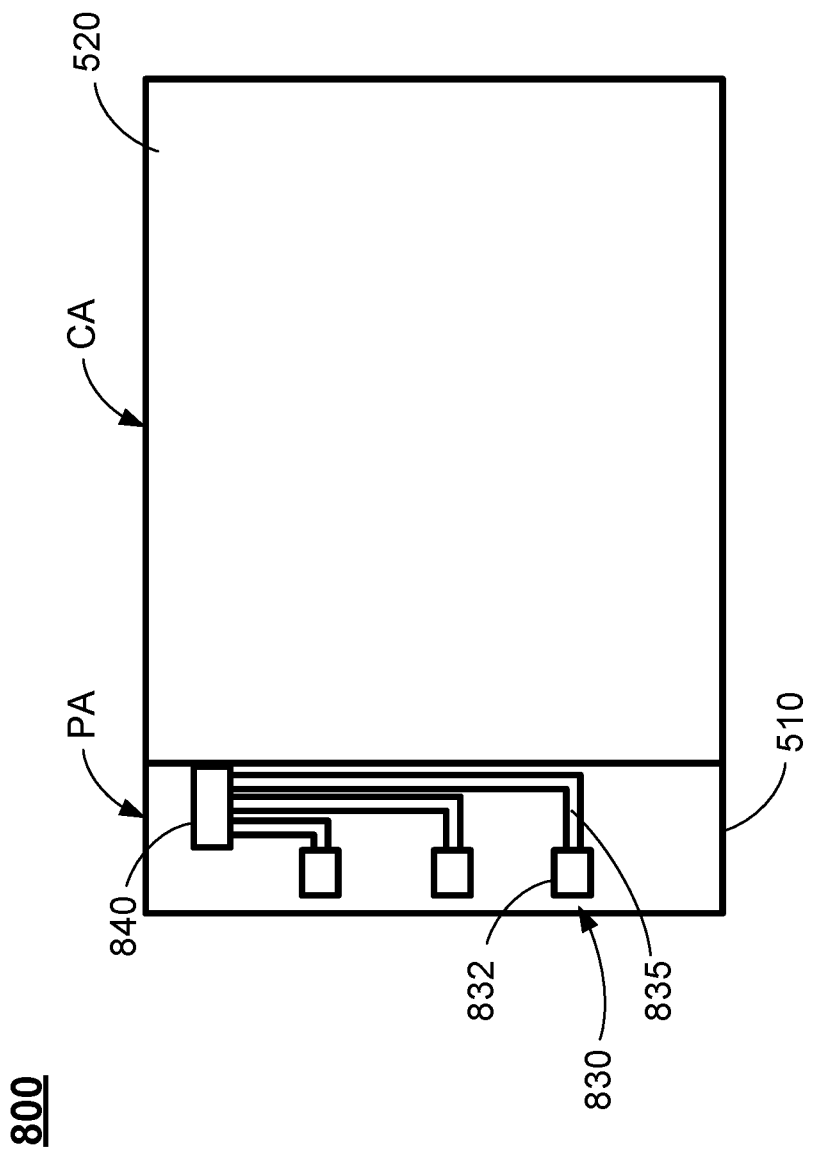

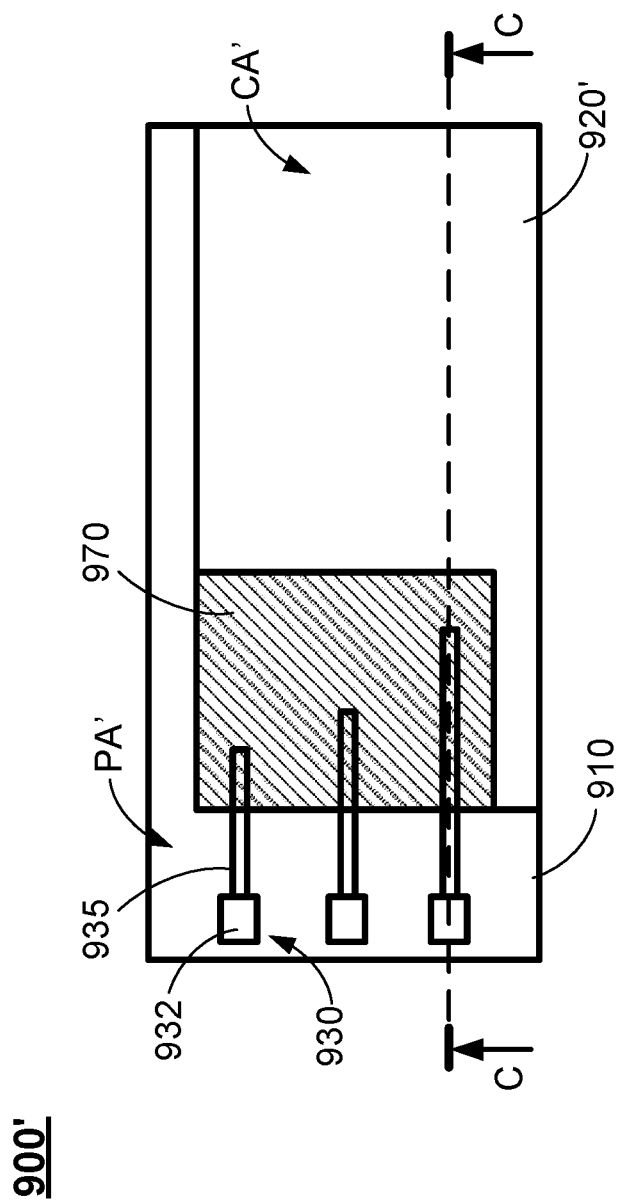

DISPLAY PANEL STRUCTURE FOR WIRELESS COMMUNICATION WITH ANTENNA ON SIDE SURFACE

FIELD

The disclosure relates generally to display technology, and more particularly to a display panel structure for wireless communication having one or more antennas on the side surface thereof.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

With the common usage of mobile devices, antenna design becomes increasingly important. In a mobile device for a typical 4G communication system, the antenna is generally larger than several centimeters, and is usually hidden at the corner positions of the inner back cover of the mobile device. When a user holds the mobile device with hands, the corner positions of the mobile device are less likely to be covered by the hands of the user, so the decay of the electro-magnetic wave being transmitted by the antenna can be minimized, and user can get better communication quality. However, with the development of new communication systems such as the 5G communication system, a new corresponding antenna design is required.

Therefore, a heretofore unaddressed need exists in the art to address the aforementioned deficiencies and inadequacies.

SUMMARY

One aspect of the disclosure relates to a display device structure, including: a back film; a display panel attached on the back film, defining a central area and a peripheral area on the back film; and at least one antenna disposed on the peripheral area of the back film; wherein the peripheral area of the back film is folded toward a back side of the display device structure, such that each of the at least one antenna disposed on the folded peripheral area directly faces a dielectric window.

In certain embodiments, the display device structure further includes a housing having two side surfaces, wherein the back film, the display panel and the at least one antenna are disposed in the housing, and the dielectric window is provided on at least one of the two side surfaces of the housing, such that each of the at least one antenna corresponds to the dielectric window.

In certain embodiments, the display device structure further includes an adhesive layer disposed between the back film and the display panel.

In certain embodiments, the back film is made of a liquid crystal polymer (LCP) material.

In certain embodiments, the display panel is a flexible display panel extending into the peripheral area, and the display panel is folded together with the peripheral area of the back film.

In certain embodiments, a width of the peripheral area of the back film is greater than one fourth of a wavelength of each of the at least one antenna.

In certain embodiments, the back film has a grounding layer insulated from the at least one antenna, and the grounding layer is disposed only in the peripheral area of the back film.

In certain embodiments, each of the at least one antenna is a microstrip antenna, a probe antenna or an aperture-coupled antenna.

In certain embodiments, the display device structure includes a plurality of antennas, wherein all of the antennas are electrically connected to a control integrated circuit (IC) disposed in the peripheral area of the back film, such that the control IC controls each of the antennas.

In certain embodiments, the at least one antenna includes a 5G antenna

In certain embodiments, each of the at least one antenna has a feeding line extending into the central area of the back film.

In certain embodiments, the display device structure further includes a shielding layer disposed between the back film and the display panel, wherein the shielding layer is made of an electrical conductive material, and the shielding layer covers the feeding line of each of the at least one antenna along a vertical direction substantially perpendicular to the display panel.

In certain embodiments, the feeding line is overlapped with a grounding pattern layer of the display panel to avoid electro-magnetic interference of the at least one antenna.

Another aspect of the disclosure relates to a display device, including: a housing having two side surfaces, at least one of the two side surfaces having a dielectric window; a back film disposed within the housing at a back side; a display panel disposed within the housing at a display side, and attached on the back film, defining a central area and a peripheral area on the back film; and at least one 5G antenna disposed on the peripheral area of the back film, wherein each of the at least one 5G antenna corresponds to the dielectric window.

In certain embodiments, the peripheral area of the back film is folded toward a back side of the housing, such that each of the at least one 5G antenna folded peripheral area directly faces the dielectric window.

In certain embodiments, the display device further includes an adhesive layer disposed between the back film and the display panel.

In certain embodiments, the display panel is a flexible display panel extending into the peripheral area, and the display panel is folded together with the peripheral area of the back film.

In certain embodiments, the back film has a grounding layer insulated from the at least one 5G antenna, the grounding layer is disposed only in the peripheral area of the back film, and each of the at least one 5G antenna is a microstrip antenna, a probe antenna or an aperture-coupled antenna.

In certain embodiments, each of the at least one 5G antenna has a feeding line extending into the central area of the back film.

In certain embodiments, the display device further includes a shielding layer disposed between the back film and the display panel, wherein the shielding layer is made of an electrical conductive material, and the shielding layer covers the feeding line of each of the at least one 5G antenna along a vertical direction substantially perpendicular to the display panel.

In a further aspect of the disclosure, a method of forming a display device structure includes: providing a back film, wherein a central area and a peripheral area are defined on the back film; forming at least one antenna on the peripheral area of the back film; attaching a display panel on the central area of the back film; folding the peripheral area of the back film toward a back side; and disposing the back film, the display panel and the at least one antenna in a housing, wherein the housing has two side surfaces, and at least one of the two side surfaces has a dielectric window, such that each of the at least one antenna in the folded peripheral area directly faces the dielectric window.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein:

FIG. 5A schematically shows a top view of a display device structure according to certain embodiments of the present disclosure, where the antennas are microstrip antennas.

FIG. 5B schematically shows a sectional view of the display device structure as shown in FIG. 5A along the A-A direction, where the peripheral area is unfolded.

FIG. 7A schematically shows a side view of a display device structure according to certain embodiments of the present disclosure, where the peripheral area is unfolded, and the grounding layer is only extended in the peripheral area of the back film.

FIG. 7B schematically shows a side view of the display device structure as shown in FIG. 7A, where the peripheral area is folded.

FIG. 8 schematically shows a top view of a display device structure according to certain embodiments of the present disclosure, where all of the microstrip antennas are electrically connected to a control IC.

FIG. 9C schematically shows a top view of a display device structure according to certain embodiments of the present disclosure, where the feeding lines of the microstrip antennas extend into the central area of the back film, and a shielding layer is provided in the display panel.

DETAILED DESCRIPTION OF THE DISCLOSURE

Figure 1:
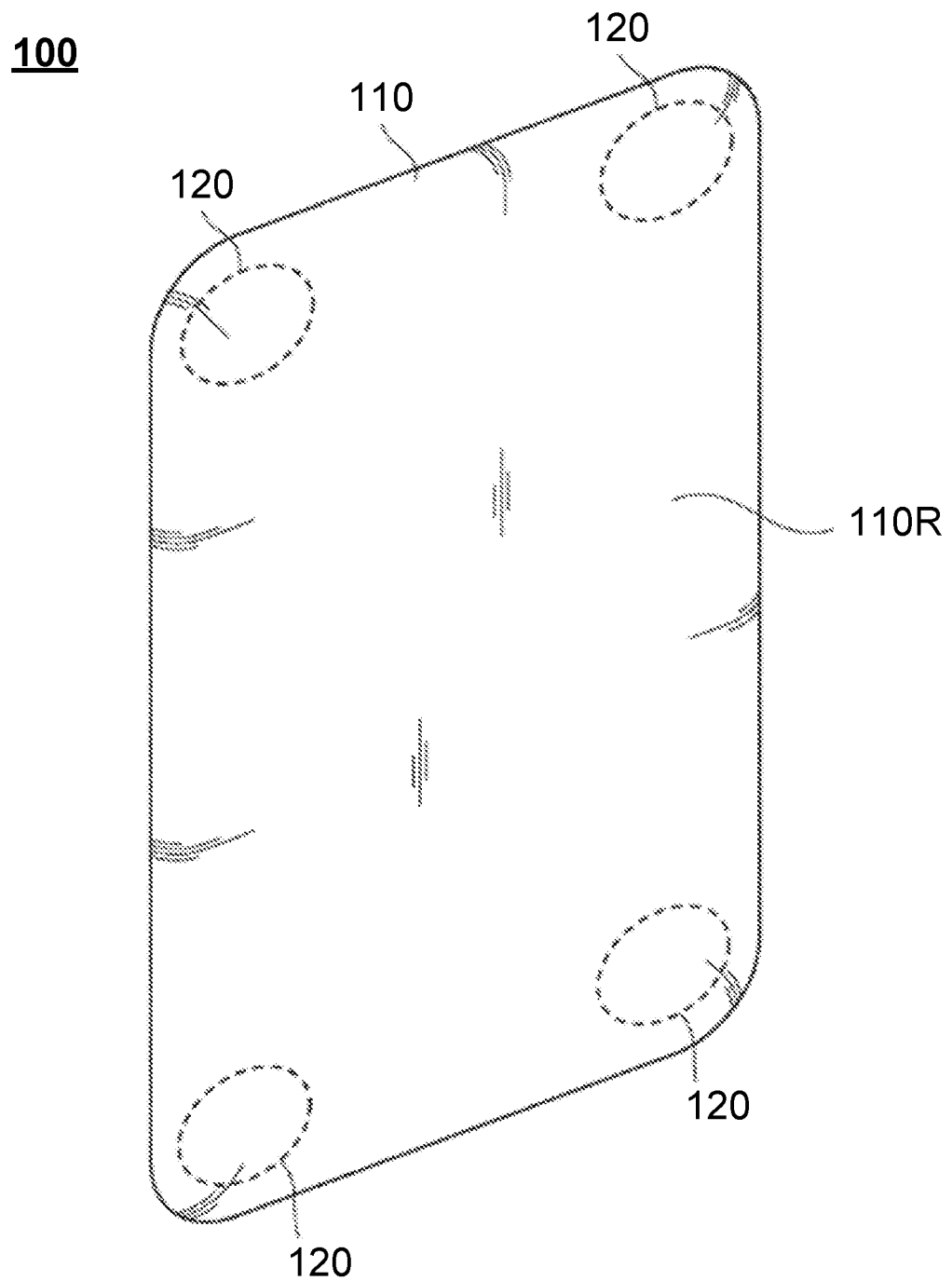
FIG. 1 schematically shows a rear perspective view of a mobile device according to certain embodiments of the present disclosure.

The present disclosure will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top", and "left" and "right", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

The description will be made as to the embodiments of the present disclosure in conjunction with the accompanying drawings. In accordance with the purposes of this disclosure, as embodied and broadly described herein, this disclosure, in certain aspects, relates to a display device structure for wireless communication having one or more antennas on the side surface thereof.

As described above, in a mobile device for a typical 4G communication system, the antenna is generally larger than several centimeters, and is usually hidden at the corner positions of the inner back cover of the mobile device. For example, FIG. 1 schematically shows a rear perspective view of a mobile device according to certain embodiments of the present disclosure. As shown in FIG. 1, the inner back cover 110 of the mobile device 100 has a back surface 110R, and the four corner positions 120 of the inner back cover 110 may be provided for the antennas.

However, with the development of new communication systems such as the 5G communication system, the transmission wavelength of the electro-magnetic wave utilized by the antenna is decreased, and the antenna size is correspondingly decreased. In this case, the antenna may be disposed in the display device structure of the mobile device due to its reduced size. Further, the shorter wavelength of the electro-magnetic wave may result in a higher transmission loss of the electro-magnetic wave during the transmission process, if the electro-magnetic wave is covered by a shielding structure, such as a metal housing of the mobile device. Thus, a corresponding antenna design is required such that the antennas are not covered by any of the existing shielding structures in the mobile device.

Figure 2:
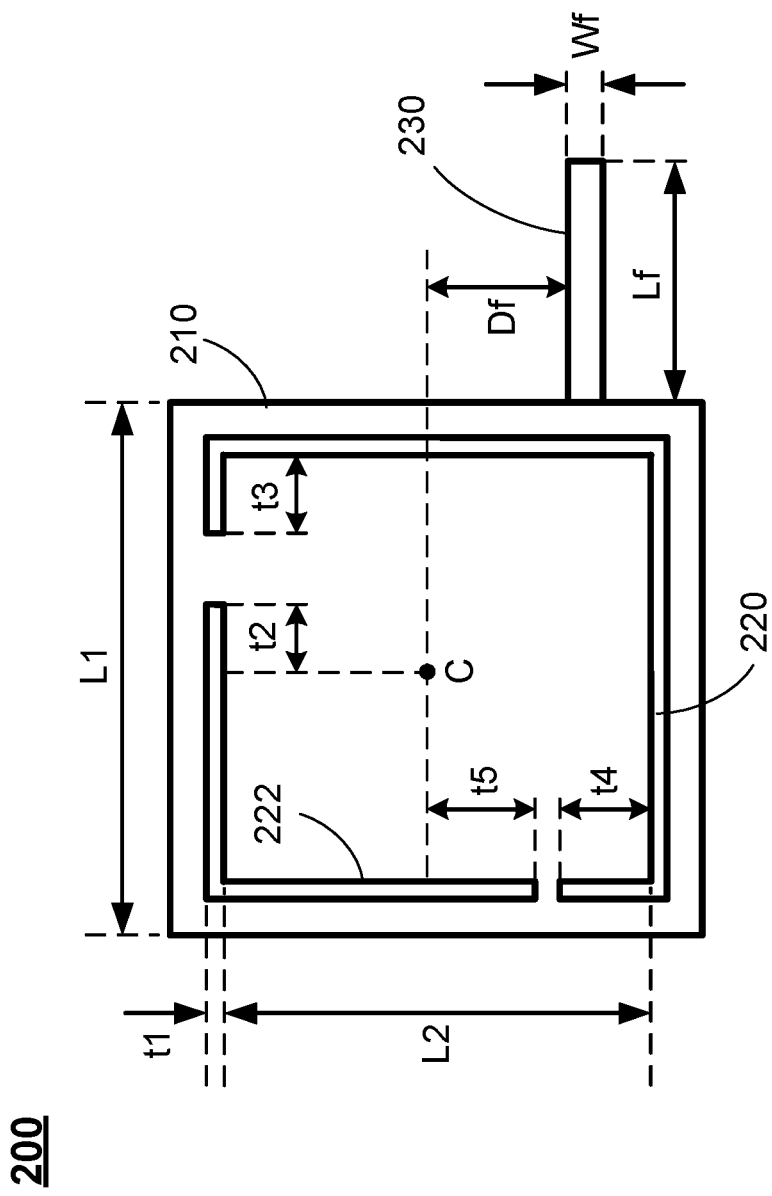
FIG. 2 schematically shows an antenna according to certain embodiments of the present disclosure.

FIG. 2 schematically shows an antenna according to certain embodiments of the present disclosure. As shown in FIG. 2, the antenna 200 may include a radiating patch 210, which is in a substantially rectangular shape having a symmetrical center C, and has multiple slots 220 and 222 formed thereon. Further, a feeding line 230 is connected to the radiating patch 210 for transmitting the signal to and from the antenna 200. As shown in FIG. 2, the design parameters of the antenna 200 may include the outer length L1 and width W1 of the radiating patch 210, the relative dimensions t1, t2, t3, t4 and t5 of the slots 220 and 222 relative to the symmetrical center C of the radiating patch 210, and the deviating dimensions Df, the length Lf and the width Wf of the feeding line 230. In certain embodiments, a set of the proposed design parameters of the antenna 200 may be provided in Table 1.

TABLE 1

| L1 | L2 | t1 | t2 | t3 |
|---|---|---|---|---|
| 3.1 mm | 2.5 mm | 0.1 mm | 0.7 mm | 0.4 mm |
| t4 | t5 | Lf | Wf | Df |
| 0.4 mm | 0.5 mm | 1.5 mm | 0.2 mm | 0.9 mm |

In certain embodiments, the size (i.e., the outer length L1 and width W1) of the radiating patch 210 of the antenna 200 may be about one fourth of a transmission wavelength of the electro-magnetic wave utilized by the antenna 200. For example, in 5G technology, the transmission frequency of the electro-magnetic wave is generally greater than 20 GHz, and the transmission wavelength is less than 10 mm. In this case, the size of the radiating patch 210 of the antenna 200 may be about 2.5 mm or less, depending on the actual transmission wavelength of the electro-magnetic wave being utilized by the antenna 200.

It should be noted that the antenna 200 as shown in FIG. 2 is merely provided as an example. In certain embodiments, the size, shape and detailed structures of the antenna may vary, without being limited to the structure of the antenna 200 as shown in FIG. 2.

Figure 3A:
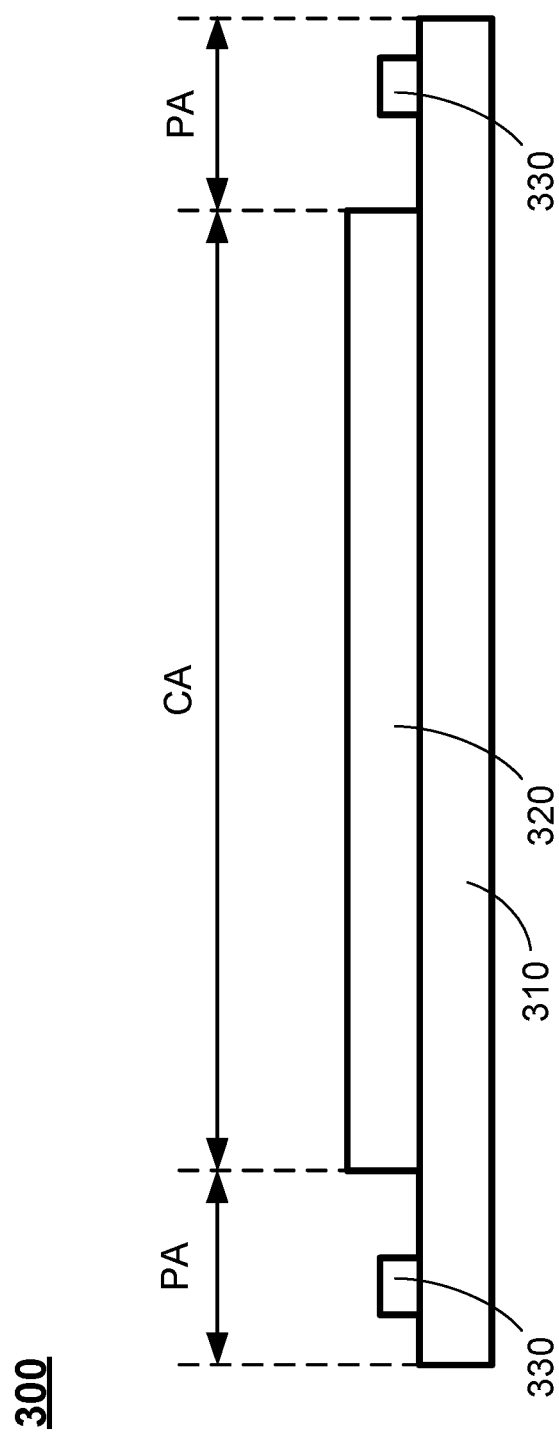
FIG. 3A schematically shows a display device structure according to certain embodiments of the present disclosure, where the peripheral areas are unfolded.
Figure 3B:
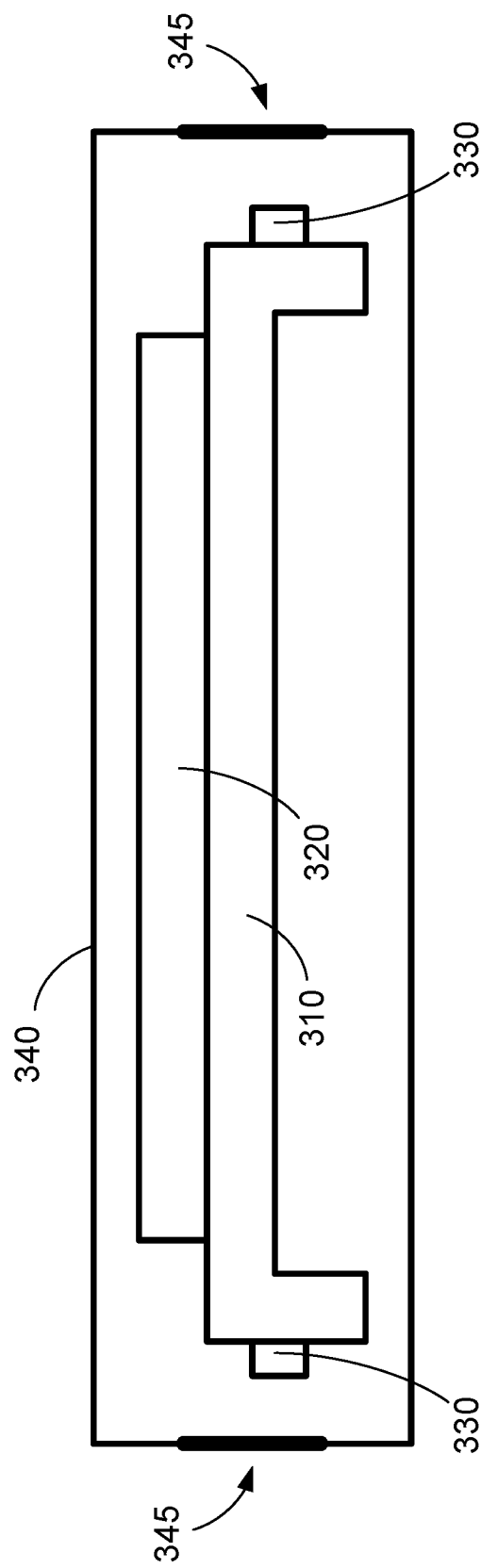
FIG. 3B schematically shows the display device structure as shown in FIG. 3A, where the peripheral areas are folded.

FIGS. 3A and 3B schematically shows a display device structure according to certain embodiments of the present disclosure in different states. Specifically, as shown in FIG. 3A, the display device structure 300 includes a back film 310, a display panel 320 attached on the back film 310, and two antennas 330 disposed on the back film 310. The back film 310 is a flexible film, which may be folded. The display panel 320 is attached to the back film 310 at a central area of the back film, thus defining the central area CA and peripheral areas PA on the back film 310. In this case, the central area CA is a display area on which the display panel 320 is disposed, and the peripheral areas PA are non-display areas not covered by the display panel 320. The antennas 330 are disposed on the peripheral areas PA on the back film 310. In this case, a width of each of the peripheral areas PA should be greater than or equal to the size of each of the antennas 330, such that the antennas 330 may be disposed on the peripheral areas PA. As shown in FIG. 3A, the peripheral areas PA are in an unfolded state. Once the antennas 330 are disposed on the peripheral areas PA on the back film 310, the peripheral areas PA of the back film 310 may be folded toward a back side (i.e., the bottom side as shown in FIGS. 3A and 3B) of the display device structure 300, as shown in FIG. 3B. In other words, the peripheral areas PA as shown in FIG. 3B are in a folded state. Then, the folded structure may be disposed in a housing 340. The housing 340 is a metal housing, which has two dielectric windows 345 located at two side surfaces of the housing 340, such that each of the antennas 330 disposed on the folded peripheral areas directly faces a corresponding dielectric window 345. In this case, the electro-magnetic wave utilized by the antennas 330 may be transmitted through the dielectric windows 345 without being shielded by the rest of the metal portions of the housing 340. On the other hand, the display panel 320 is disposed on the front side (i.e., the top side as shown in FIGS. 3A and 3B) of the display device structure 300, such that the front side of the display device structure 300 is the display side.

As discussed above, each of the antennas 330 is disposed in the corresponding peripheral areas PA of the back film 310. Thus, the width of each peripheral area PA should be greater than the size of each antenna 330 to allow the antenna 330 to be disposed thereon. Since the size of each antenna 330 may be about one fourth of a transmission wavelength of the electro-magnetic wave utilized by the antenna 330, the width of each peripheral area PA of the back film 310 should be greater than one fourth of the transmission wavelength of the electro-magnetic wave utilized by each antenna 330.

Figure 3C:
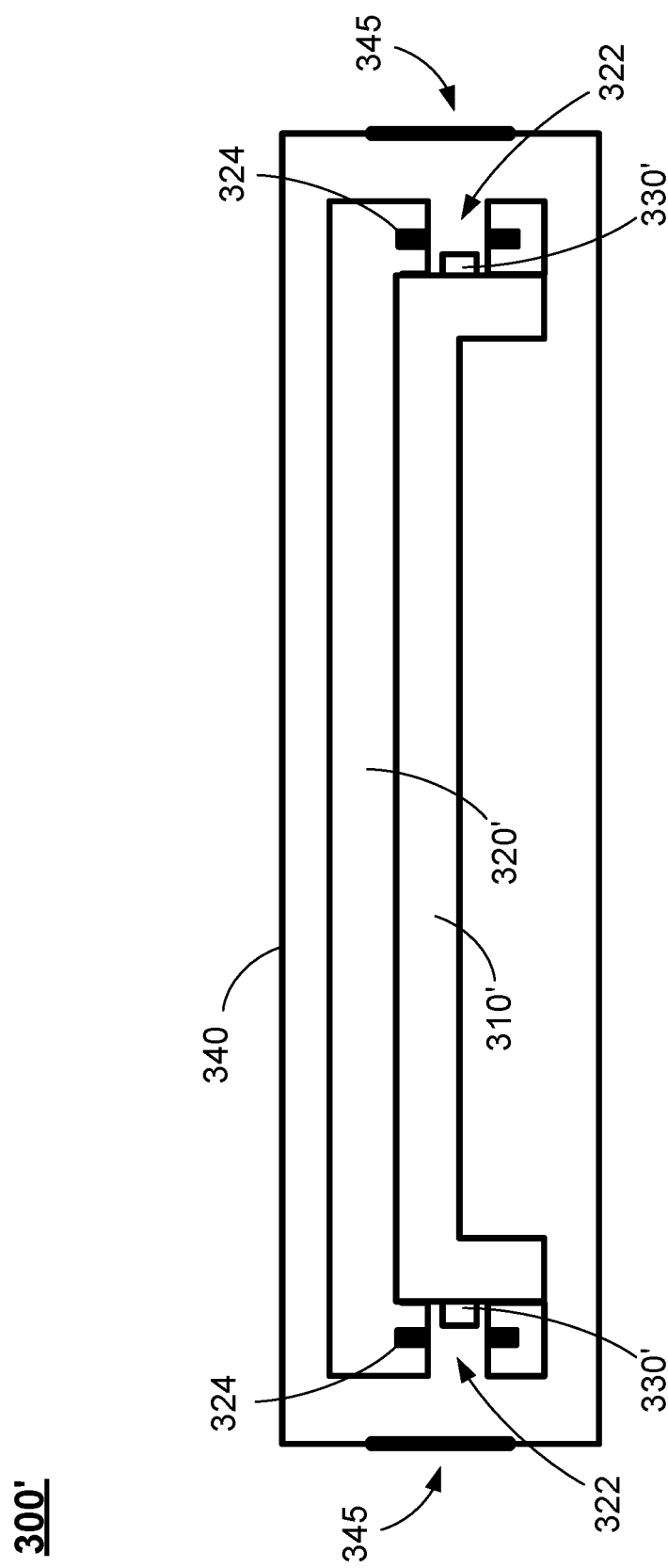
FIG. 3C schematically shows a display device structure according to certain embodiments of the present disclosure, where the peripheral areas are folded.

As shown in FIGS. 3A and 3B, the display panel 320 only covers the central area CA of the back film 310, without extending into the peripheral areas PA. In certain embodiments, the display panel may extend into the peripheral areas. For example, FIG. 3C schematically shows a display device structure according to certain embodiments of the present disclosure, where the peripheral areas are folded. As shown in FIG. 3C, the display device structure 300' also includes a back film 310' and a display panel 320' attached on the back film 310'. Comparing to the display device structure 300 as shown in FIG. 3B, in the display device structure 300' as shown in FIG. 3C, the display panel 320' covers substantially all of the areas on the back film 310'. In other words, the display panel 320' extends into the peripheral areas of the back film 310'. In this case, the peripheral areas are not non-display areas because portions of the display panel 320' are in the peripheral areas. On the display panel 320', two through holes 322 are formed in the peripheral areas, such that the antennas 330' disposed on the peripheral areas may be exposed through the through holes 322. Correspondingly, the display panel 320' has a grounding pattern layer 324, which is disposed in the areas adjacent to the through holes 322 to be around the antennas 330'. Thus, the grounding pattern layer 324 may be used to prevent the antennas 330' from causing electro-magnetic interference to the pixels of the display panel 310'.

Figure 3D:
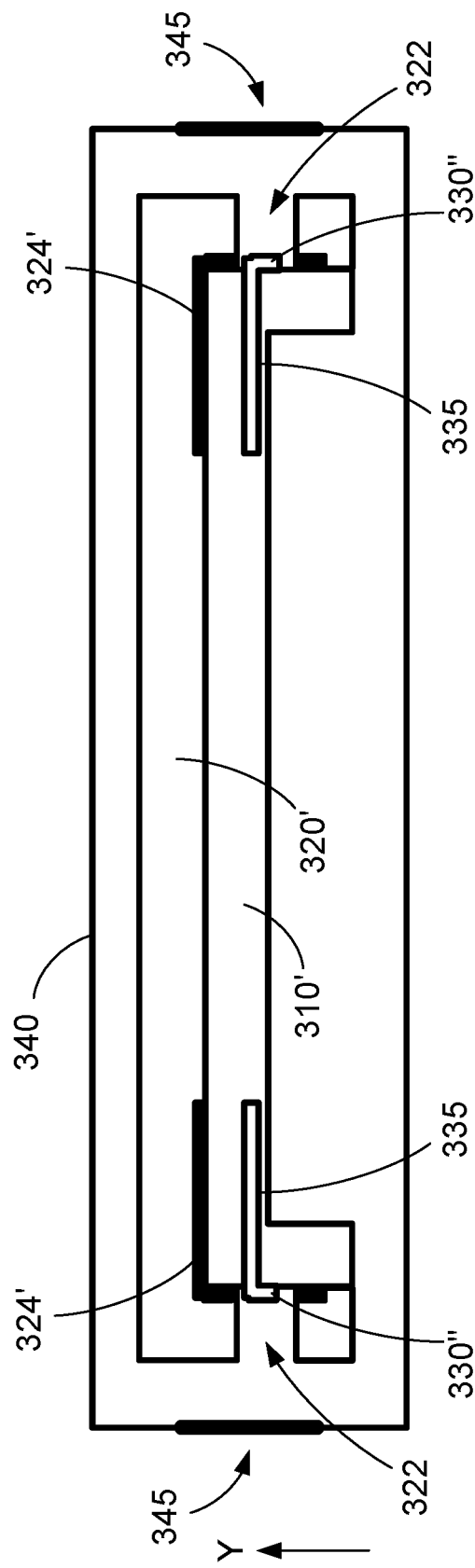
FIG. 3D schematically shows a display device structure according to certain embodiments of the present disclosure, where the peripheral areas are folded.

As shown in FIG. 3C, the grounding pattern layer 324 is only disposed in the areas adjacent to the through holes 322 to be around the antennas 330'. In certain embodiments, each of the antennas may include the feeding line as shown in FIG. 2. Thus, the grounding pattern layer may also extend to correspond to the feeding lines of the antennas. FIG. 3D schematically shows a display device structure according to certain embodiments of the present disclosure, where the peripheral areas are folded. Specifically, the only different between the display device structure 300" as shown in FIG. 3D from the display device structure 300' as shown in FIG. 3C exists in that each of the antennas 330" has a corresponding feeding line 335 extending on or in the back film 310'. Correspondingly, the grounding pattern layer 324' of the display panel 320' also extends in the display panel 320' to overlap with the feeding lines 335 of the antennas 330" in a vertical direction Y (i.e., the vertical direction as shown in FIG. 3D) perpendicular to the display panel 310'. Thus, the grounding pattern layer 324' may be used to prevent the antennas 330" and the feeding lines 335 from causing electro-magnetic interference to the pixels of the display panel 310'.

As shown in each of FIGS. 3C and 3D, the display panel 320' extends into the peripheral areas of the back film 310'. Thus, when the peripheral areas of the back film 310' are folded toward the back side (i.e., the bottom side as shown in FIGS. 3C and 3D) of the display device structure, the portions of the display panel 320' extending into the peripheral areas of the back film 310' are also folded altogether with the back film 310'. In this case, the display panel 320' should be a flexible display panel, allowing the display panel 320' to be folded together with the peripheral area of the back film 310'.

Figure 4:
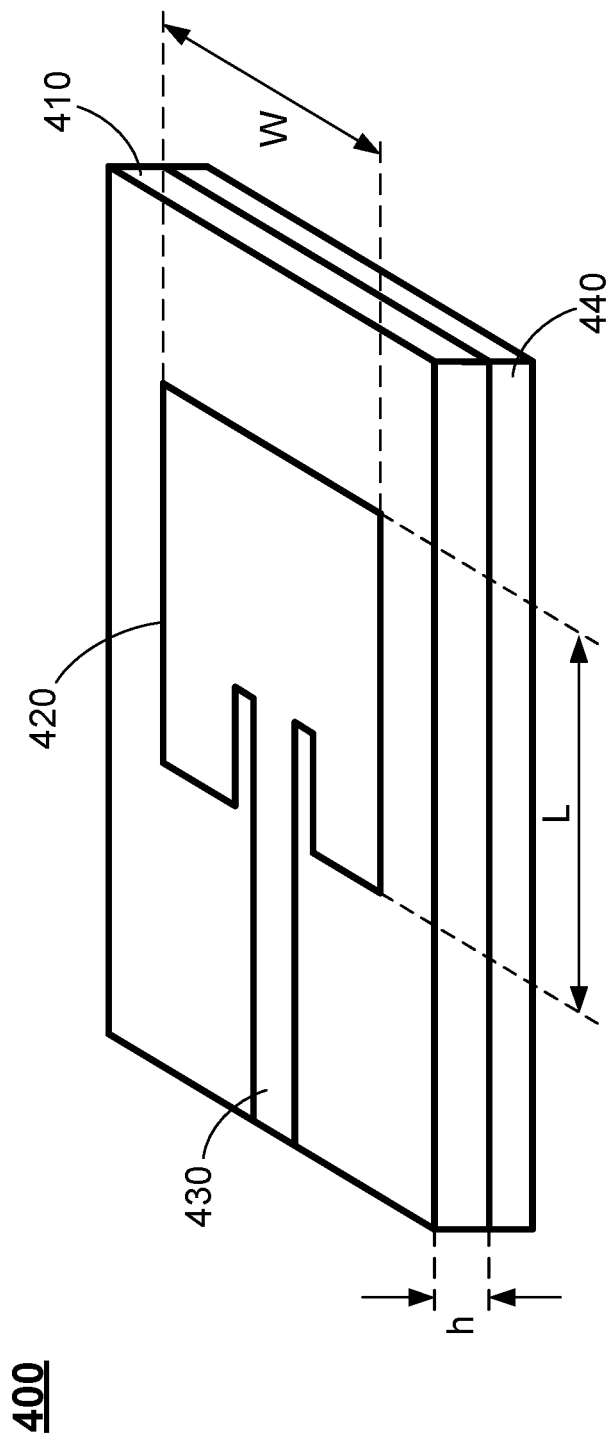
FIG. 4 schematically shows a microstrip antenna structure according to certain embodiments of the present disclosure.

In the display device structures according to the embodiments as shown in FIGS. 3A to 3D, the antennas being used in each display device structure may be 5G antennas or near field communication (NFC) antennas, and each antenna may have a specific antenna structure, which may be identical to or different from the antenna structures of other antennas in the same display device structure. In certain embodiments, a microstrip antenna structure may be used as the antenna. FIG. 4 schematically shows a microstrip antenna structure according to certain embodiments of the present disclosure. As shown in FIG. 4, the microstrip antenna structure 400 includes a dielectric substrate 410, on which the radiating patch 420 of the antenna and the feeding line 430 are provided. Further, a grounding layer 440 of the antenna is disposed below the dielectric substrate 410, thus forming the microstrip antenna. The grounding layer 440 of the antenna is insulated from the radiating patch 420 of the antenna and the feeding line 430 by the dielectric substrate 410, which may be made of a liquid crystal polymer (LCP) material or other dielectric materials. In certain embodiments, the dielectric substrate 410 may function as a part of the back film of the display device structure. The design parameters of the microstrip antenna structure 400 include, without being limited thereto, the length L and the width W of the radiating patch 420, as well as the height of the dielectric substrate 410.

Figure 5C:
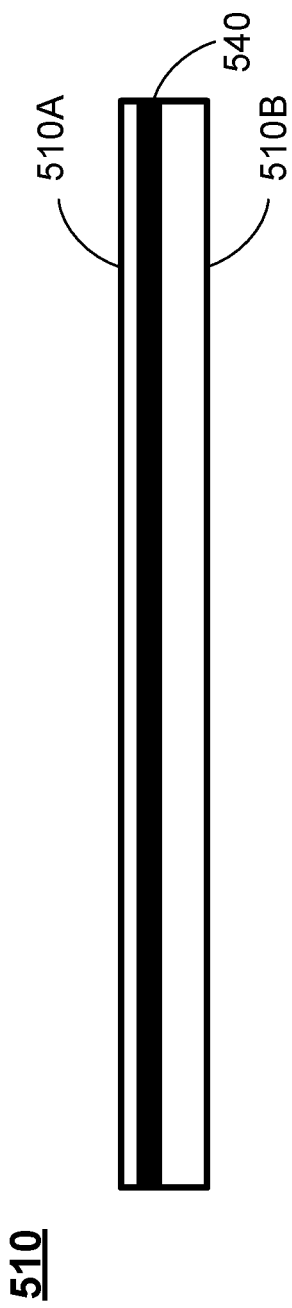
FIG. 5C schematically shows an enlarged view of the back film as shown in FIG. 5B.
Figure 5D:
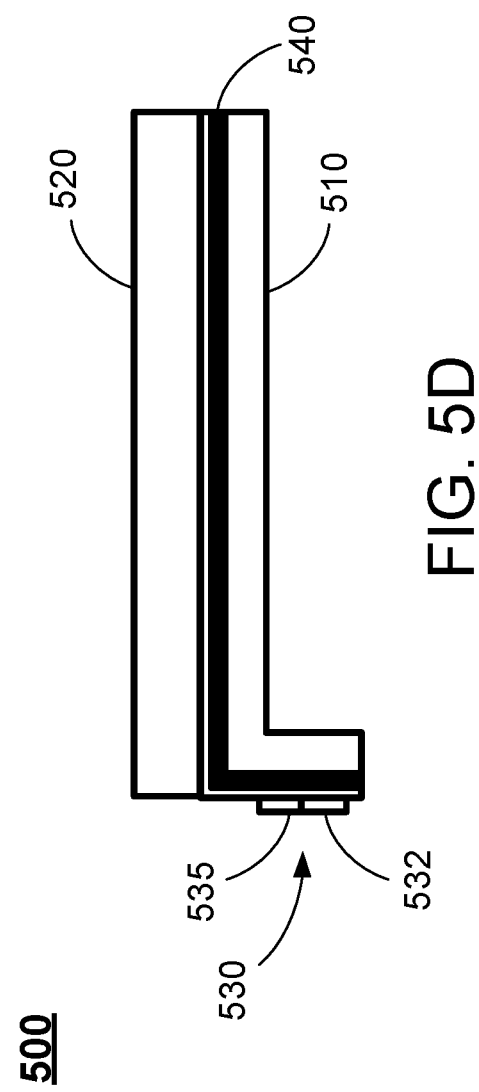
FIG. 5D schematically shows a sectional view of the display device structure as shown in FIG. 5A along the A-A direction, where the peripheral area is folded.

FIGS. 5A, 5B, 5C and 5D schematically show a display device structure according to certain embodiments of the present disclosure, where the antennas are microstrip antennas. Specifically, FIG. 5A shows a top view of the display device structure 500, which includes a back film 510 and a display panel 520 attached to the back film 510, defining a central area CA and a peripheral area PA. It should be noted that the display device structure 500 as shown in FIG. 5A includes only one peripheral area PA, and the "central" area CA is not exactly located in the center of the display device structure 500. Multiple patches 532 of the microstrip antennas 530 are disposed in the peripheral area PA of the back film 510, and each patch 530 has a corresponding feeding line 535. Further, as shown in FIG. 5B, a grounding layer 540 is disposed in the back film 510, and is insulated from the patches 530 and the feeding lines 535 of the microstrip antennas. In certain embodiments, the grounding layer 540 may be made of a metal or other electrically conductive materials, such as graphene. Specifically, as shown in FIG. 5C, the back film 510 is formed by two insulating layers 510A and 510B sandwiching the grounding layer 510. In certain embodiments, the two insulating layers 510A and 510B of the back film 510 may be made of LCP materials or other dielectric materials. In certain embodiments, the back film 510 may be formed by disposing the grounding layer 510 between the two insulating layers 510A and 510B to form the sandwich structure, and stamping altogether the sandwich structure. In certain embodiments, the thickness of the back film 510 may be in a range between 10 μm and 500 μm, and in one embodiment, the thickness of the back film 510 may be 50 μm and 150 μm. As shown in FIG. 5D, the peripheral area PA of the back film 510 is folded toward a back side (i.e., the bottom side as shown in FIG. 5D) of the display device structure 500.

Figure 6:
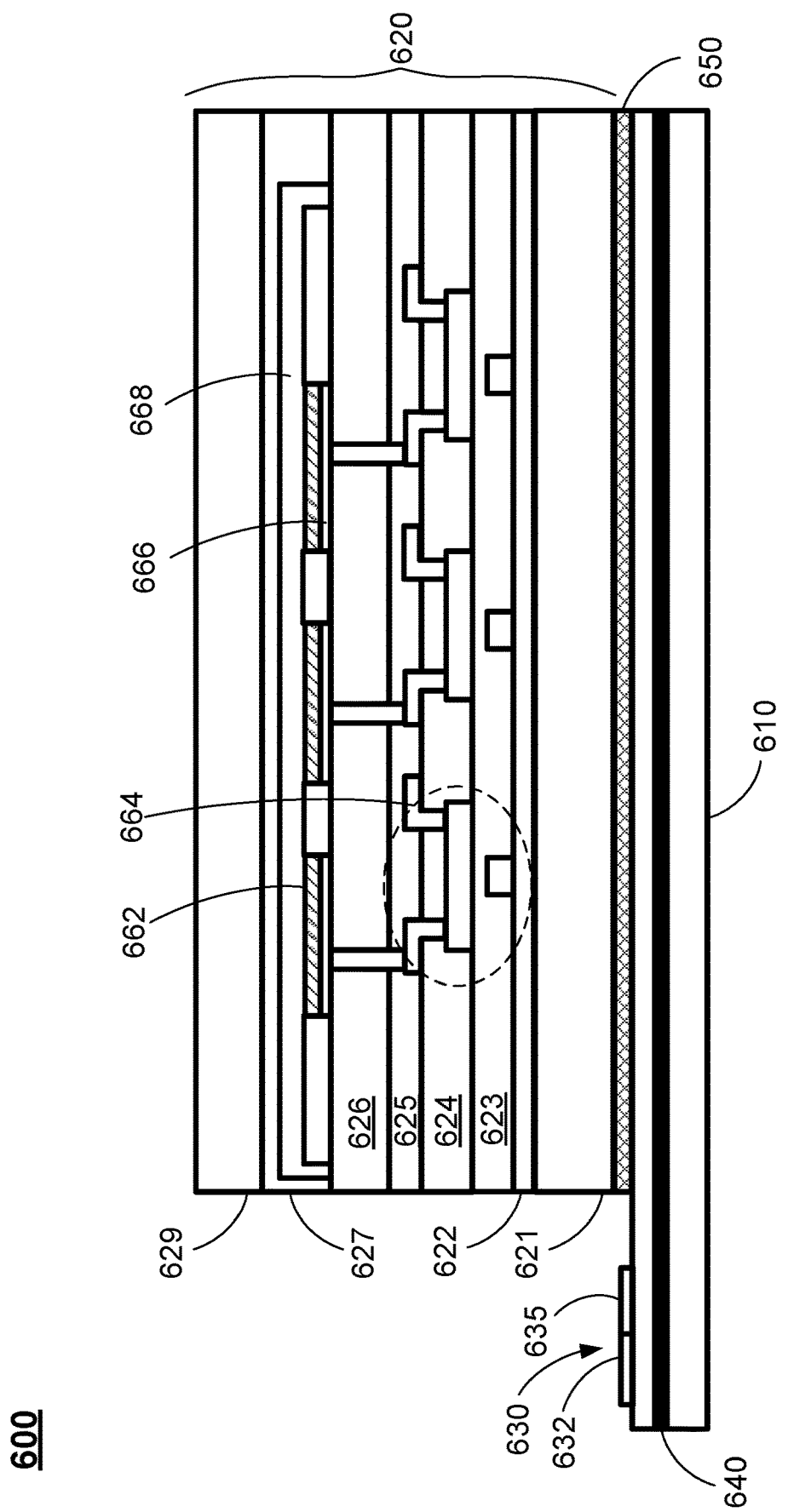
FIG. 6 schematically shows a sectional view of a display device structure according to certain embodiments of the present disclosure, where the antennas are microstrip antennas.

FIG. 6 schematically shows a sectional view of a display device structure according to certain embodiments of the present disclosure, where the antennas are microstrip antennas. As shown in FIG. 6, the display device structure 600 includes a back film 610, a display panel 620, and a microstrip antenna 630. The display panel 620 is attached to the back film 610 by an adhesive layer 650 disposed between the back film 610 and the display panel 620. The display panel 620 includes a substrate 621 and a stack layered structure disposed on the substrate 621. Specifically, the stack layered structure of the display panel 620 includes, without being limited thereto, a buffer layer 622, a GI layer 623, an interlayer dielectric (ILD) layer 624, a passivation layer 625, an insulating layer 626, an anode layer 666, a light-emitting layer 662, a cathode layer 668, a encapsulating layer 627, a cover layer 629 and thin-film transistors (TFT) 664. It should be noted that the detailed components, layers and structures of the display panel 620 may vary, and are thus not herein elaborated. The structure of the microstrip antenna is similar to the corresponding structure of the antennas as shown in FIGS. 5B and 5D, including a patch 632 and a feeding line 635 disposed in the peripheral area of the back film 610, and a grounding layer 640 disposed in the back film 610.

As shown in FIGS. 5A to 5D, the grounding layer 540 extends throughout the whole back film 510. In certain embodiments, the grounding layer may extend only through a part of the back film. For example, FIGS. 7A and 7B schematically show a display device structure according to certain embodiments of the present disclosure. Specifically, FIG. 7A shows that the peripheral area is in the unfolded state, and FIG. 7B shows that the peripheral area is folded. As shown in FIG. 7A, in the display device structure 700, the back film 710 is formed by two insulating layers 710A and 710B sandwiching a grounding layer 740, which is only extended in the peripheral area of the back film 710 and does not extend into the central area of the back film 710. As shown in FIG. 7B, when the peripheral area PA of the back film 710 is folded toward a back side (i.e., the bottom side as shown in FIG. 7B) of the display device structure 700, the grounding layer 740 is folded altogether with the folded peripheral area PA. Other components of the display device structure 700, including the display panel 520 as well as the patch 532 and the feeding line 535 of the microstrip antenna 530, are identical to the corresponding components with the same reference numbers in the display device structure 500 as shown in FIGS. 5A to 5D, and are thus not elaborated herein.

FIG. 8 schematically show a top view of a display device structure according to certain embodiments of the present disclosure. Specifically, the display device structure 800 as shown in FIG. 8 is different from the display device structure 500 as shown in FIG. 5A in that a control IC 840 is disposed in the peripheral area PA of the back film 510 to control all of the microstrip antennas 830. Specifically, as shown in FIG. 8, the feeding line 835 of each of the microstrip antennas 830 is electrically connected to the control IC 840, such that the patches 832 of all microstrip antennas are all connected to the same control IC 840, allowing the control IC to control each of the antennas. Other components of the display device structure 800, including the back film 510 and the display panel 520, are identical to the corresponding components with the same reference numbers in the display device structure 500 as shown in FIG. 5A, and are thus not elaborated herein.

Figure 9A:
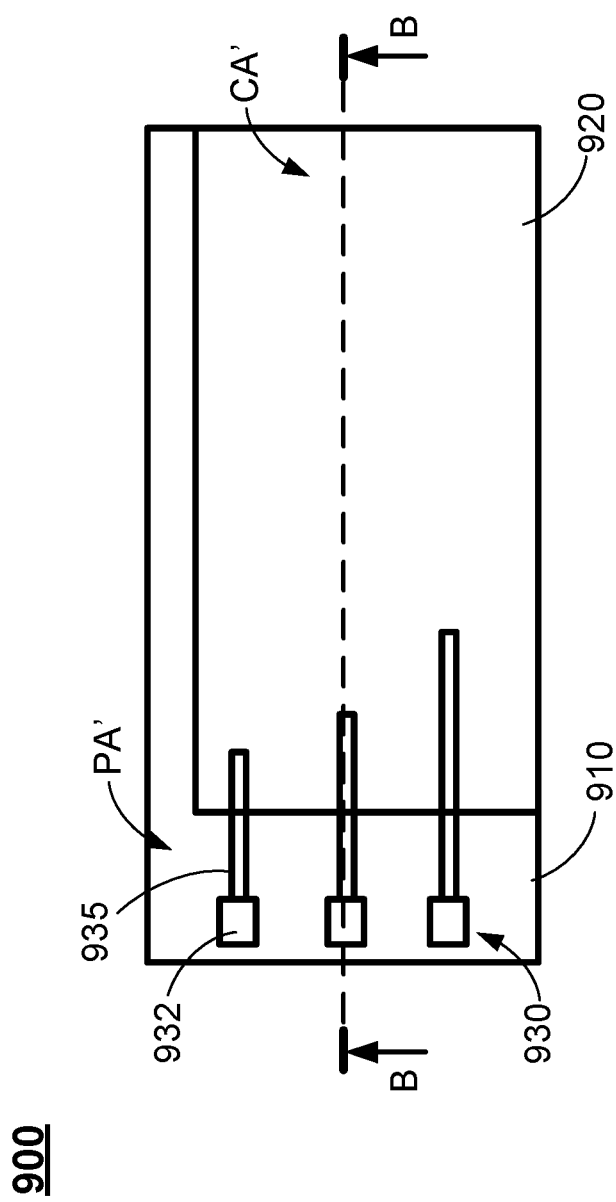
FIG. 9A schematically shows a top view of a display device structure according to certain embodiments of the present disclosure, where the feeding lines of the microstrip antennas extend into the central area of the back film.
Figure 9B:
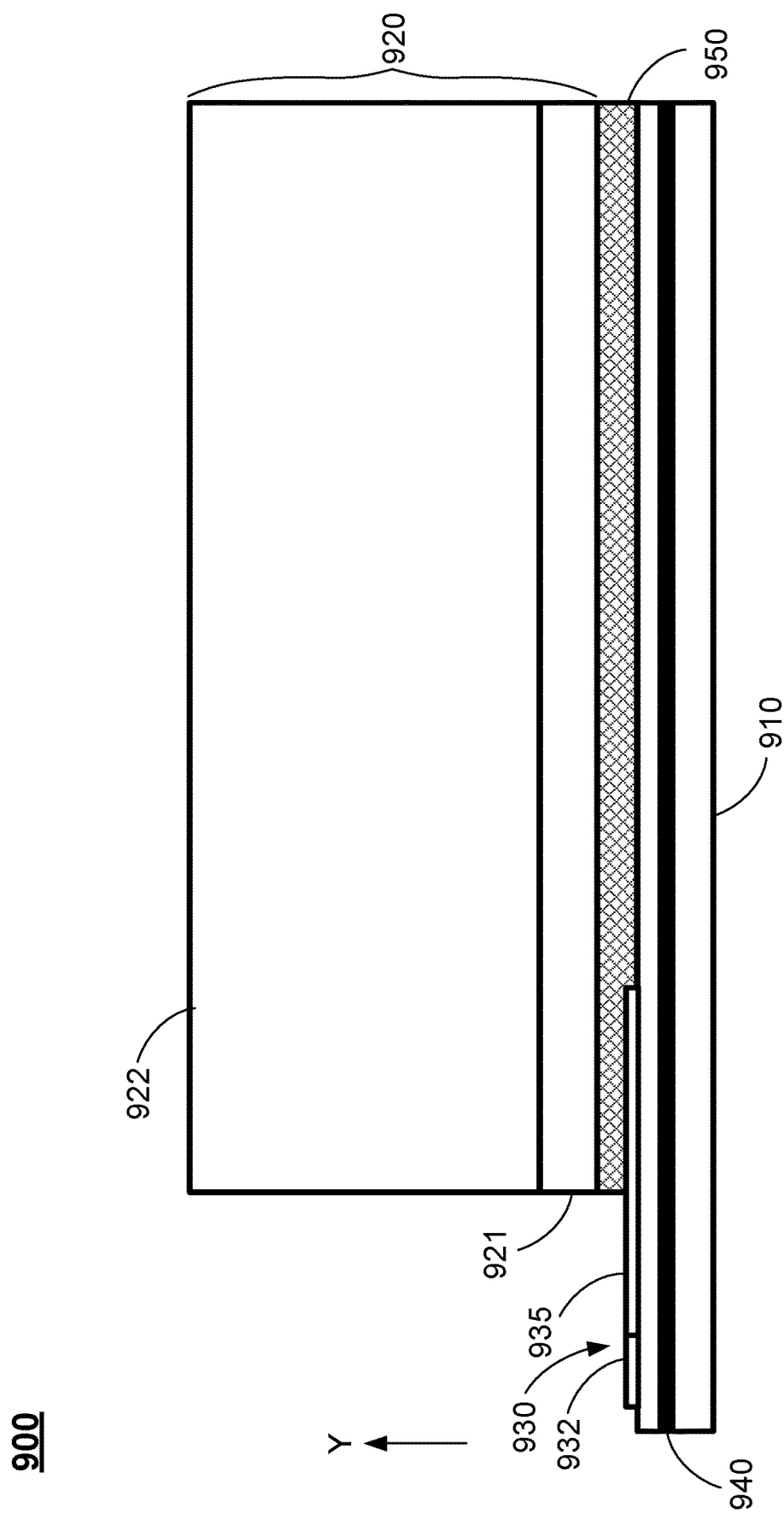
FIG. 9B schematically shows a sectional view of the display device structure as shown in FIG. 9A along the B-B direction.

In the embodiments as described above, the feeding lines of the microstrip antennas are all located in the peripheral area of the back film. In certain embodiments, the feeding lines of the microstrip antennas may extend into the central area of the back film to be located under a portion of the display panel, allowing the feeding lines to be arranged more easily. For example, FIGS. 9A and 9B schematically show a display device structure according to certain embodiments of the present disclosure, where the feeding lines of the microstrip antennas extend into the central area of the back film. Specifically, FIG. 9A shows a top view of the display device structure 900, and FIG. 9B shows a sectional view of the display device structure 900. As shown in FIG. 9A, the display device structure 900 includes a back film 910, a display panel 920, and multiple microstrip antennas 930. Specifically, the display panel 920 does not cover the left side and upper side of the back film 910 as shown in FIG. 9A, leaving the left side and upper side of the back film 910 to form an L-shaped peripheral area PA'. Each of the microstrip antenna 930 includes a patch 932 and a feeding line 935. The patches 932 of the microstrip antennas 930 are disposed in the peripheral area PA' of the back film 910. The feeding lines 935 of the microstrip antennas extend from the peripheral area PA' into the central area CA' to be disposed under the display panel 920. As shown in FIG. 9B, the display panel 920 is attached to the back film 910 by an adhesive layer 950 disposed between the back film 910 and the display panel 920, and the feeding line 935 extends into the adhesive layer 950 to be disposed under the substrate 921 of the display panel 920. The stack layered structure 922 is disposed on the substrate 921. The detailed components, layers and structures of the stack layered structure 922 of the display panel 920 may vary, and are thus not herein elaborated. A grounding layer 940 disposed in the back film 910. In this case, the feeding line arrangement allows the control IC (not shown) to be located on the upper-right location of the peripheral area PA' as shown in FIG. 9A.

Figure 9D:
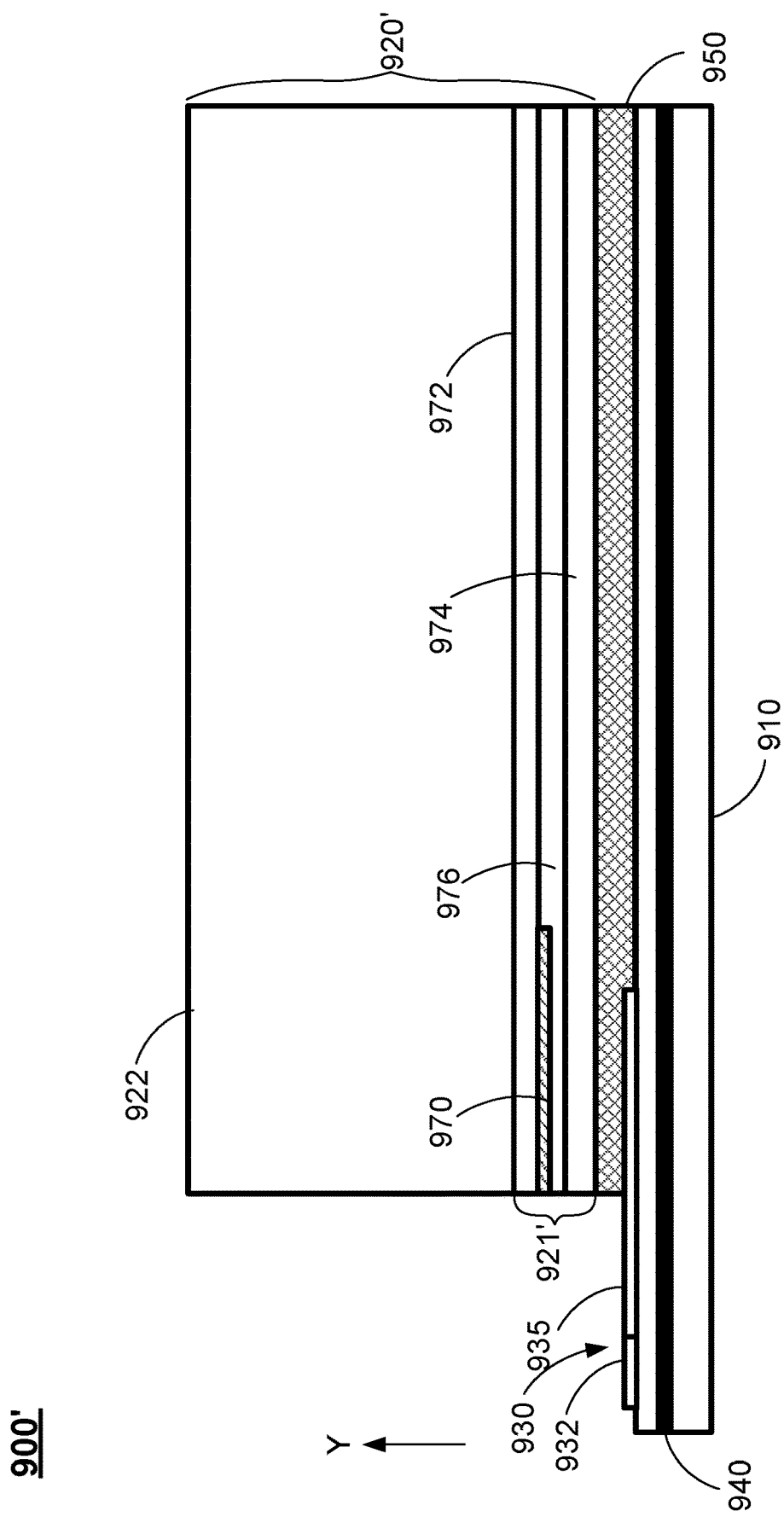
FIG. 9D schematically shows a sectional view of the display device structure as shown in FIG. 9C along the C-C direction.

In the embodiment as shown in FIGS. 9A and 9B, the feeding lines 935 of the microstrip antennas extend from the peripheral area PA' into the central area CA' to be disposed under the display panel 920. In this case, the feeding lines 935 may cause electro-magnetic interference to the pixels of the display panel 920. In certain embodiments, a shielding layer may be provided in the display panel 920 to prevent the feeding lines 935 from causing the electro-magnetic interference to the pixels of the display panel 920. For example, FIGS. 9C and 9D schematically show a display device structure according to certain embodiments of the present disclosure, where the feeding lines of the microstrip antennas extend into the central area of the back film, and a shielding layer is provided in the display panel. Specifically, FIG. 9C shows a top view of the display device structure 900', and FIG. 9D shows a sectional view of the display device structure 900'. The display device structure 900' as shown in FIGS. 9C and 9D is different from the display device structure 900 as shown in FIGS. 9A and 9B in that a shielding layer 970 is provided in the display panel 920'. Specifically, as shown in FIG. 9D, the substrate 921' of the display panel 920' may be a multi-layer structure, including two substrate layers 972 and 974 being attached together by an adhesive layer 976, and the shielding layer 970 is sandwiched between the two substrate layers 972 and 974. In this case, the shielding layer 970 may cover the feeding lines 935 along a vertical direction Y (i.e., the vertical direction as shown in FIG. 9D) substantially perpendicular to the display panel 920'. In certain embodiments, the shielding layer 970 may be made of an electrical conductive material, such as metal or graphene, to provide shielding effects. Other components of the display device structure 900' are identical to the corresponding components with the same reference numbers in the display device structure 900 as shown in FIGS. 9A and 9B, and are thus not elaborated herein.

Figure 10A:
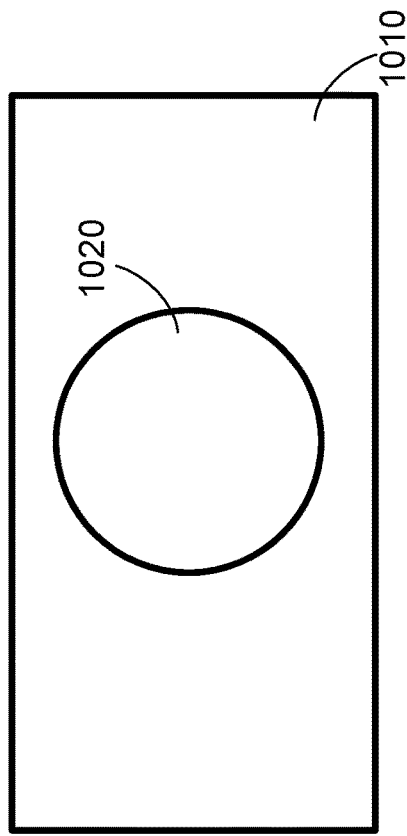
FIG. 10A schematically shows a top view of a probe antenna structure according to certain embodiments of the present disclosure.
Figure 10B:
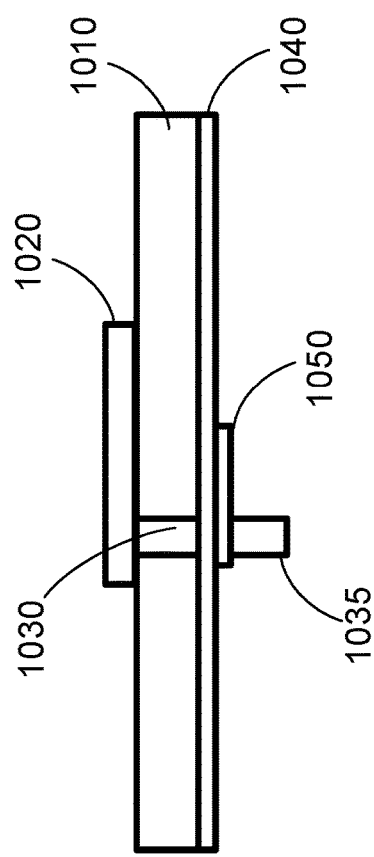
FIG. 10B schematically shows a side view of the probe antenna structure as shown in FIG. 10A.

In the embodiments as described above, the microstrip antenna structure is used in the display device structure. In certain embodiments, a probe antenna structure may be used as the antennas of the display device structure. FIGS. 10A and 10B schematically show a probe antenna structure according to certain embodiments of the present disclosure. Specifically, FIG. 10A shows a top view of the probe antenna structure 1000, and FIG. 10B shows a side view of the probe antenna structure 1000. As shown in FIGS. 10A and 10B, the probe antenna structure 1000 includes a dielectric substrate 1010, a radiating patch 1020 disposed on the dielectric substrate 1010, a grounding layer 1040 disposed below the dielectric substrate 1010, and an coaxial cable 1030 penetrating through the dielectric substrate 1010 and the grounding layer 1040 to function as the feeding line of the probe antenna. The periphery of the coaxial cable 1030 is coated by an insulating layer. Further, a conductive sheet 1050 is disposed around the periphery of the coaxial cable 1030 and connected to the grounding layer 1040, such that the periphery of the coaxial cable 1030 is grounded. In this case, the grounding layer 1040 is insulated from the radiating patch 1020 and the coaxial cable 1030 (i.e., the feeding line) by the dielectric substrate 1010. The bottom end 1035 of the coaxial cable 1030 may be connected to other extension feeding lines (not shown). In certain embodiments, the dielectric substrate 1010 may be made of the LCP material or other dielectric materials.

Figure 11A:
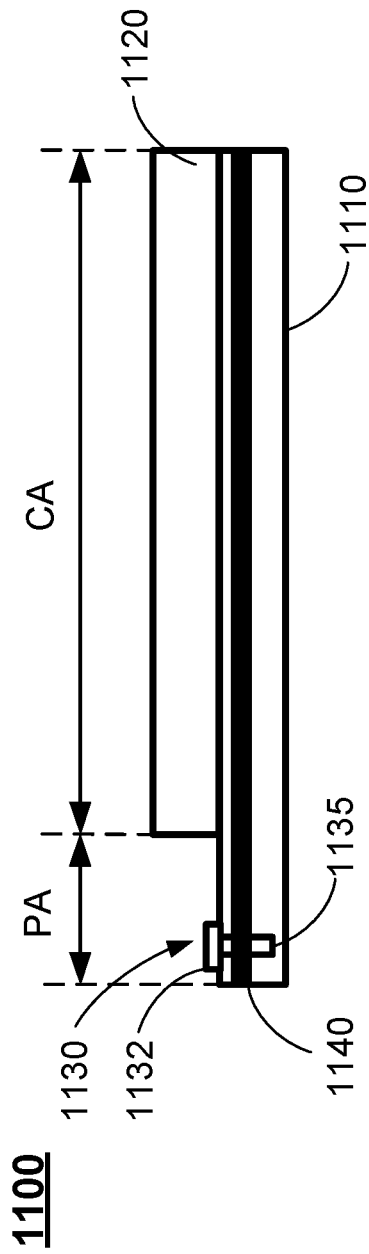
FIG. 11A schematically shows a side view of a display device structure according to certain embodiments of the present disclosure, where the antenna is a probe antenna, and the peripheral area is unfolded.
Figure 11B:
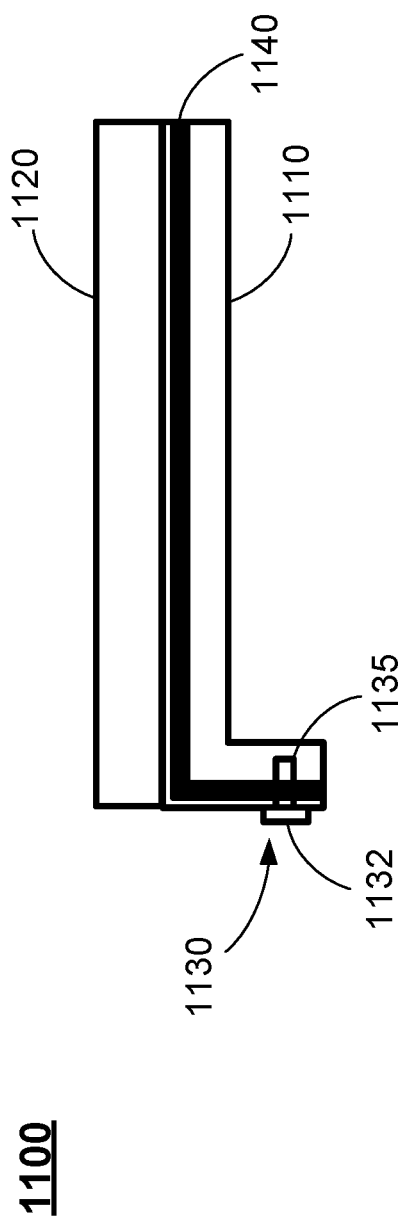
FIG. 11B schematically shows a side view of the display device structure as shown in FIG. 11A, where the peripheral area is folded.

FIGS. 11A and 11B schematically show a display device structure according to certain embodiments of the present disclosure, where the antenna is a probe antenna. As shown in FIG. 11A, the display device structure 1100 includes a back film 1110 and a display panel 1120 attached to the back film 1110, defining a central area CA and a peripheral area PA. Specifically, FIG. 11A shows that the back film 1110 is in the unfolded state, and FIG. 11B shows that the peripheral area of the back film 1110 is folded. As shown in FIG. 11A, a grounding layer 1140 is disposed in the back film 1110. A radiating patch 1130 of the probe antenna is disposed in the peripheral area of the back film 1110, and a coaxial cable 1135 is provided as the feeding line for the patch 1130, penetrating through the grounding layer 1135, such that the grounding layer 1140 is insulated from the patch 1132 and the coaxial cable 1135 of the probe antenna 1130.

Figure 12:
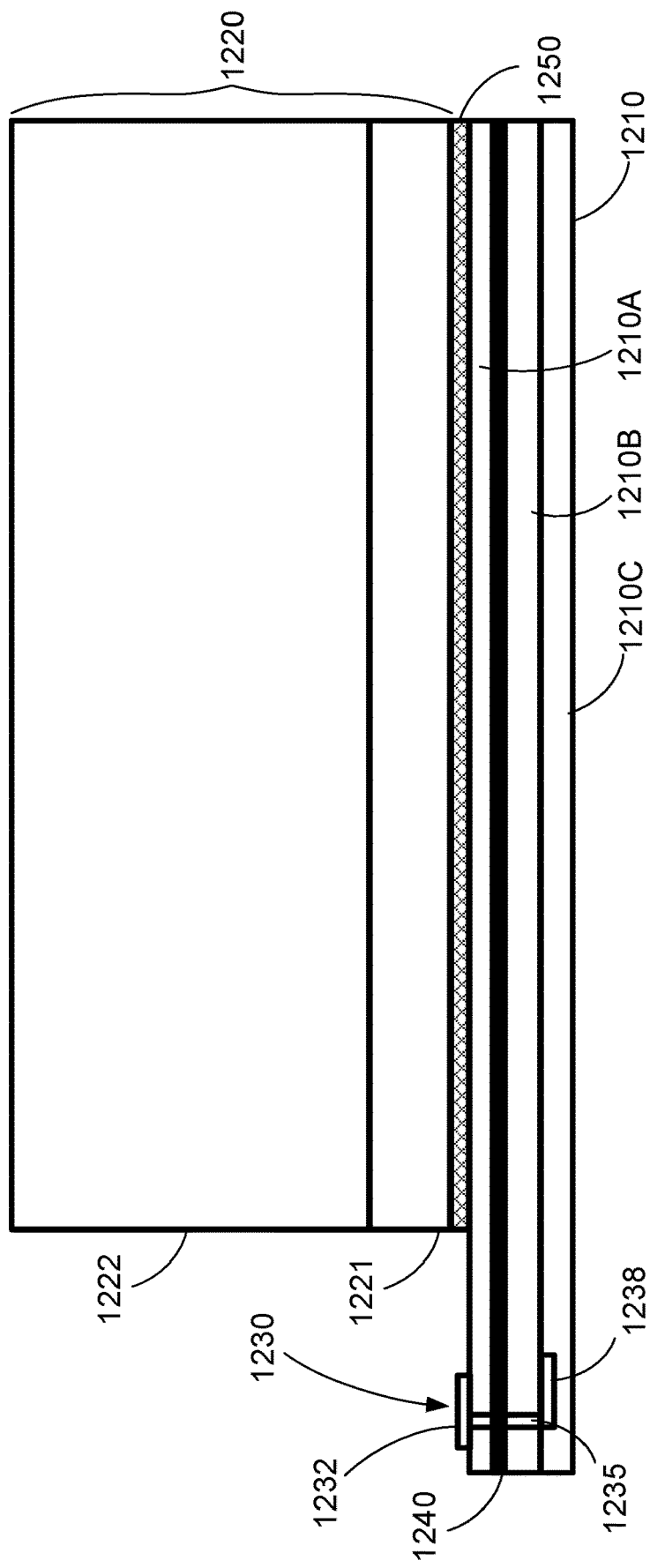
FIG. 12 schematically shows a sectional view of a display device structure according to certain embodiments of the present disclosure, where the antennas are probe antennas.

FIG. 12 schematically shows a sectional view of a display device structure according to certain embodiments of the present disclosure. Specifically, the display device structure 1200 as shown in FIG. 12 is different from the display device structure 600 as shown in FIG. 6 in that the antenna is a probe antenna. As shown in FIG. 12, the display device structure 1200 includes a back film 1210, a display panel 1220, and a probe antenna 1230. The display panel 1220 is attached to the back film 1210 by an adhesive layer 1250 disposed between the back film 1210 and the display panel 1220. The display panel 1220 includes a substrate 1221 and a stack layered structure 1222 disposed on the substrate 1221. The detailed components, layers and structures of the stack layered structure 1222 of the display panel 1220 may vary, and are thus not herein elaborated. The structure of the probe antenna is similar to the corresponding structure of the probe antenna as shown in FIGS. 11A and 11B, including a patch 1232, a coaxial cable 1235 functioning as the feeding line, and a grounding layer 1240 disposed in the back film 1210. The bottom end of the coaxial cable 1235 is connected to an extension feeding line 1238. Specifically, the back film 1210 is a multi-layer structure, including three insulating layers 1210A, 1210B and 1210C, where the insulating layers 1210A and 1210B sandwich the grounding layer 1240, and the insulating layers 1210B and 1210C sandwich the extension feeding line 1238.

As shown in FIG. 12, the structures of the display device structure 1200 other than the probe antenna are similar to the corresponding structures of the display device structure 600 as shown in FIG. 6. In certain embodiments, the structures of the display device structure 1200 as shown in FIG. 12 may be further modified. For example, in certain embodiments, the grounding layer 1240 may be modified to be only extended in the peripheral area of the back film 1210 and does not extend into the central area of the back film 1210, which is similar to the grounding layer 740 as shown in FIGS. 7A and 7B. In certain embodiments, the extension feeding line 1238 of the probe antenna may be modified to be electrically connected to a control IC, such that the patch 1230 of each of the probe antennas are all connected to the same control IC, which is similar to the structure as shown in FIG. 8. In certain embodiments, the extension feeding line 1238 of the probe antenna may be modified to extend into the central area of the back film 1210, which is similar to the structure as shown in FIGS. 9A and 9B, and a shielding layer may be added in the display panel 1220, which is similar to the structure as shown in FIGS. 9C and 9D. Details of these embodiments are not elaborated herein.

Figure 13:
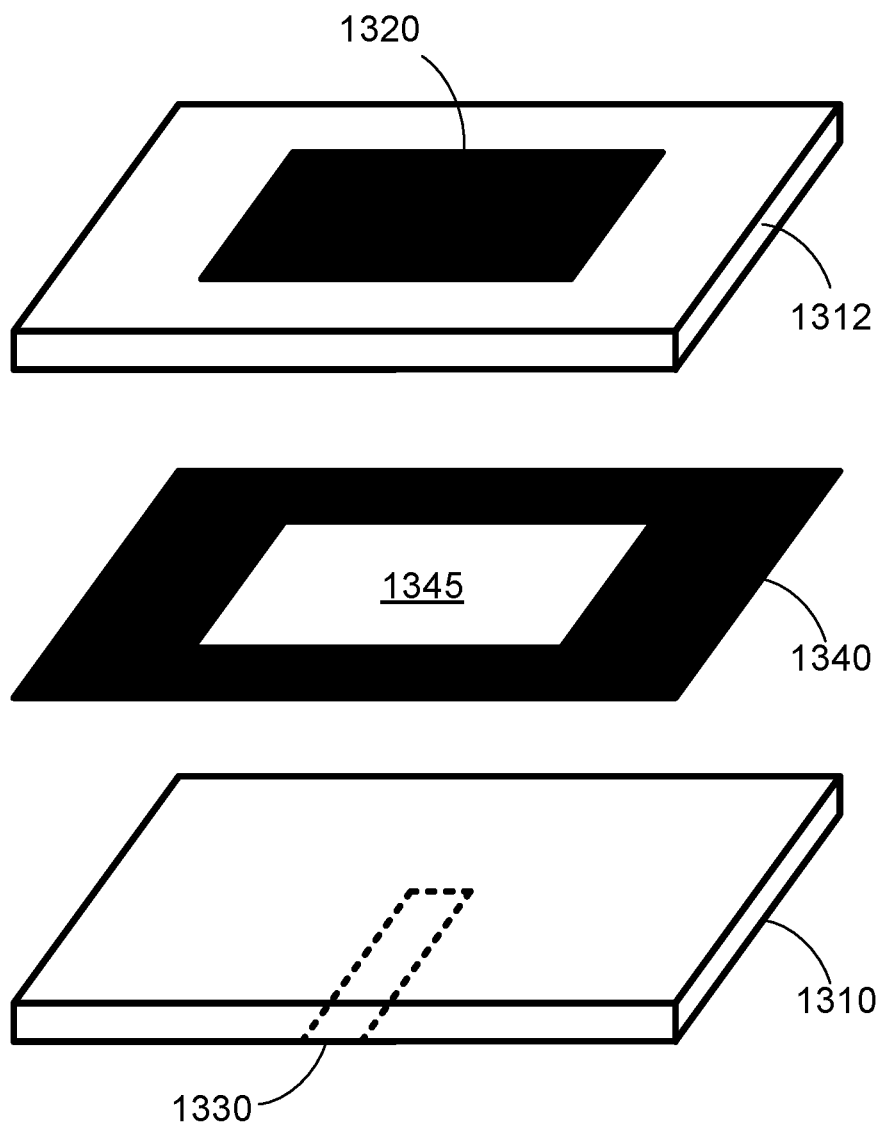
FIG. 13 schematically shows an exploded view of an aperture-coupled antenna structure according to certain embodiments of the present disclosure.

In certain embodiments, an aperture-coupled antenna structure may be used as the antennas of the display device structure. FIG. 13 schematically shows an exploded view of an aperture-coupled antenna structure according to certain embodiments of the present disclosure. As shown in FIG. 13, the aperture-coupled antenna structure 1300 includes two dielectric substrates 1310 and 1312 disposed opposite to each other. A patch 1320 is disposed on the top side of the top dielectric substrate 1312. A feeding line 1330 is disposed on the bottom side of the bottom dielectric substrate 1310. Further, a grounding layer 1340 is sandwiched between the two dielectric substrates 1310 and 1312, such that the grounding layer 1340 is disposed between the patch 1320 and the feeding line 1330. The grounding layer 1340 has a hole 1345 located between the patch 1320 and an end of the feeding line 1330. In certain embodiments, the dielectric substrates 1310 and 1312 may function as a part of the back film of the display device structure.

Figure 14A:
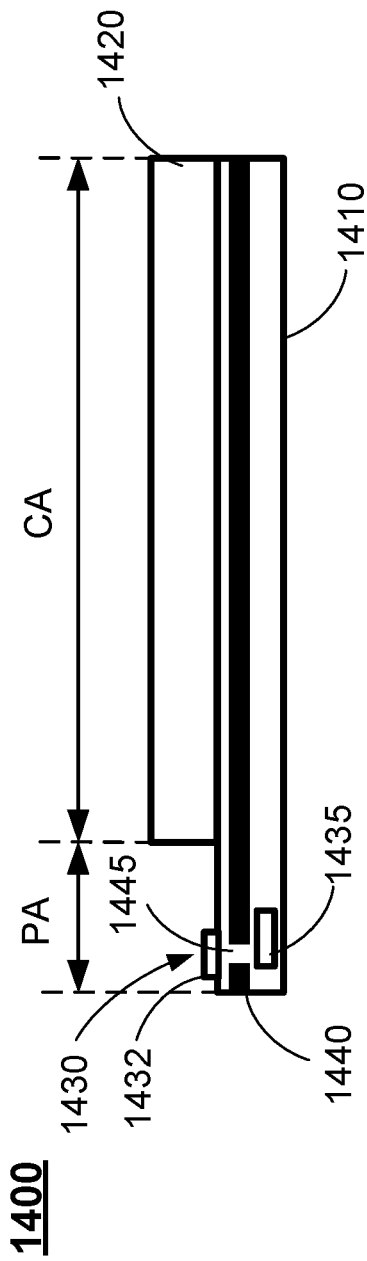
FIG. 14A schematically shows a side view of a display device structure according to certain embodiments of the present disclosure, where the antenna is an aperture-coupled antenna, and the peripheral area is unfolded.
Figure 14B:
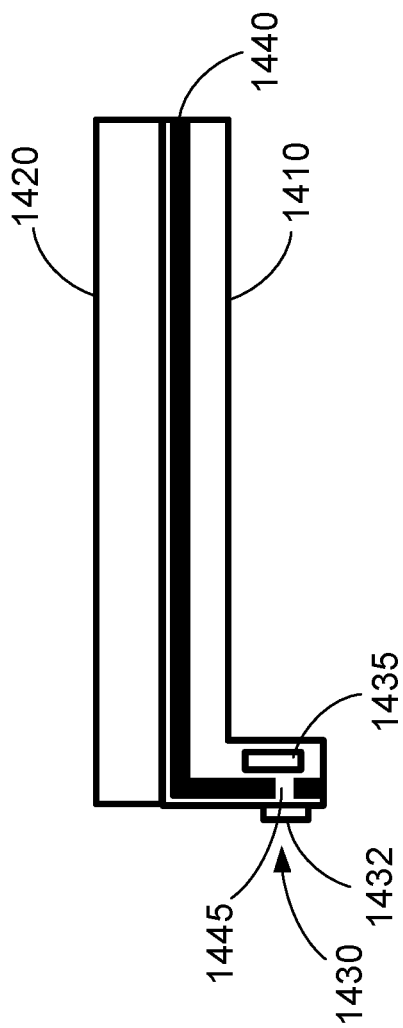
FIG. 14B schematically shows a side view of the display device structure as shown in FIG. 14A, where the peripheral area is folded.

FIGS. 14A and 14B schematically show a display device structure according to certain embodiments of the present disclosure, where the antenna is an aperture-coupled antenna. As shown in FIG. 14A, the display device structure 1400 includes a back film 1410 and a display panel 1420 attached to the back film 1410, defining a central area CA and a peripheral area PA. Specifically, FIG. 14A shows that the back film 1410 is in the unfolded state, and FIG. 14B shows that the peripheral area of the back film 1410 is folded. As shown in FIG. 14A, a radiating patch 1430 of the aperture-coupled antenna 1430 is disposed in the peripheral area of the back film 1410, and a feeding line 1435 is disposed in the back film 1410. A grounding layer 1440 is disposed in the back film 1410, and a hole 1445 is formed in the grounding layer 1440 to be located between the radiating patch 1432 and one end of the feeding line 1435.

Figure 15:
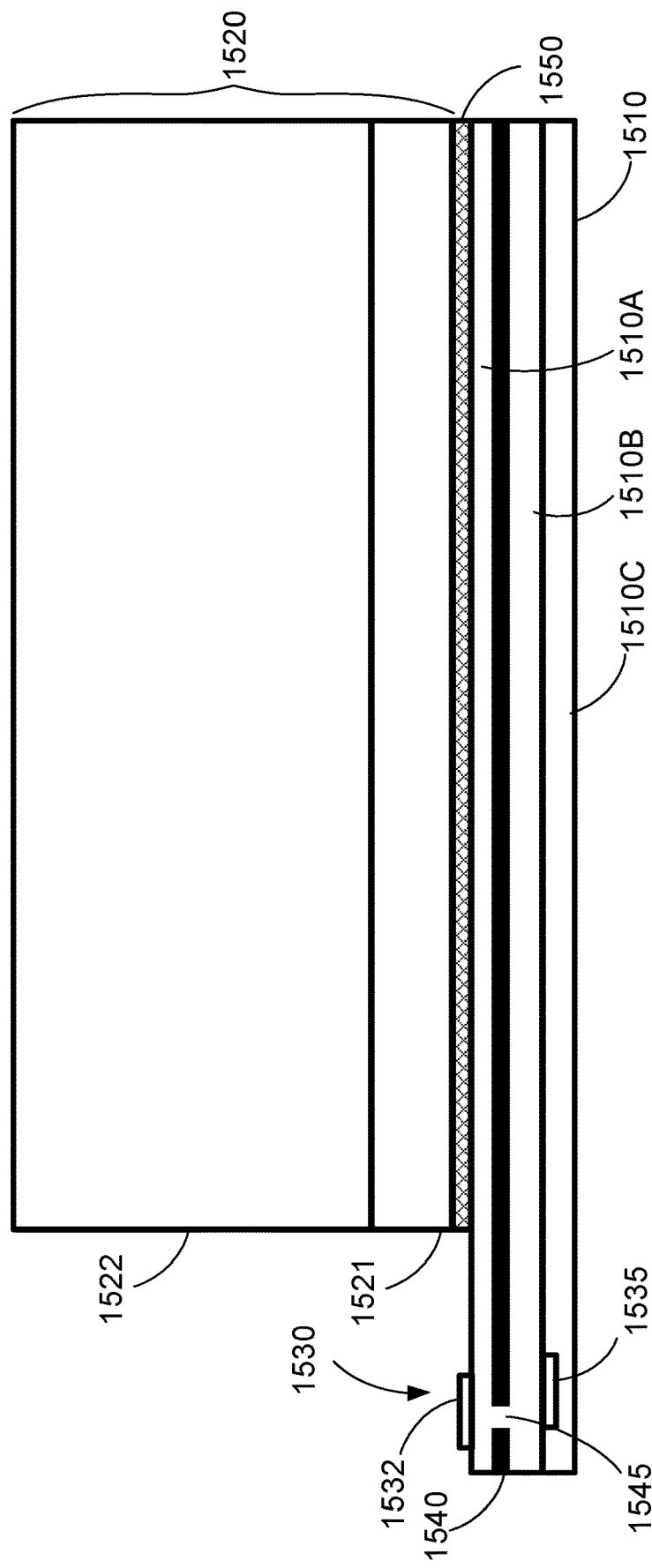
FIG. 15 schematically shows a sectional view of a display device structure according to certain embodiments of the present disclosure, where the antennas are aperture-coupled antennas.

FIG. 15 schematically shows a sectional view of a display device structure according to certain embodiments of the present disclosure. Specifically, the display device structure 1500 as shown in FIG. 15 is different from the display device structure 1200 as shown in FIG. 12 in that the antenna is an aperture-coupled antenna. As shown in FIG. 15, the display device structure 1500 includes a back film 1510, a display panel 1520, and an aperture-coupled antenna 1530. The display panel 1520 is attached to the back film 1510 by an adhesive layer 1550 disposed between the back film 1510 and the display panel 1520. The display panel 1520 includes a substrate 1521 and a stack layered structure 1522 disposed on the substrate 1521. The detailed components, layers and structures of the stack layered structure 1522 of the display panel 1520 may vary, and are thus not herein elaborated. The structure of the aperture-coupled antenna is similar to the corresponding structure of the aperture-coupled antenna as shown in FIGS. 14A and 14B, including a patch 1532, a feeding line 1535, and a grounding layer 1540 disposed in the back film 1210. The grounding layer 1540 is provided with a hole 1545 between the patch 1532 and one end of the feeding line 1535. Specifically, the back film 1510 is a multi-layer structure, including three insulating layers 1510A, 1510B and 1510C, where the insulating layers 1510A and 1510B sandwich the grounding layer 1540, and the insulating layers 1510B and 1510C sandwich the feeding line 1535.

As shown in FIG. 15, the structures of the display device structure 1500 other than the aperture-coupled antenna are similar to the corresponding structures of the display device structure 1200 as shown in FIG. 12. In certain embodiments, the structures of the display device structure 1500 as shown in FIG. 15 may be further modified. For example, in certain embodiments, the grounding layer 1540 may be modified to be only extended in the peripheral area of the back film 1510 and does not extend into the central area of the back film 1510, which is similar to the grounding layer 740 as shown in FIGS. 7A and 7B. In certain embodiments, the feeding line 1535 of the aperture-coupled antenna may be modified to be electrically connected to a control IC, such that the patch 1532 of each of the aperture-coupled antennas are all connected to the same control IC, which is similar to the structure as shown in FIG. 8. In certain embodiments, the feeding line 1535 of the probe antenna may be modified to extend into the central area of the back film 1510, which is similar to the structure as shown in FIGS. 9A and 9B, and a shielding layer may be added in the display panel 1520, which is similar to the structure as shown in FIGS. 9C and 9D. Details of these embodiments are not elaborated herein.

In the embodiments as described above, each of the antennas is disposed on the folded peripheral areas of the back film to directly face a corresponding dielectric window. In this case, the antennas are not covered by the metal portions of the housing. Thus, the metal housing does not block the electro-magnetic wave being transmitted to and from the antennas, thus reducing the transmission loss of the electro-magnetic wave. This is particularly essential for the 5G antennas due to the shorter wavelength of the electro-magnetic wave utilized by the antennas.

Figure 16:
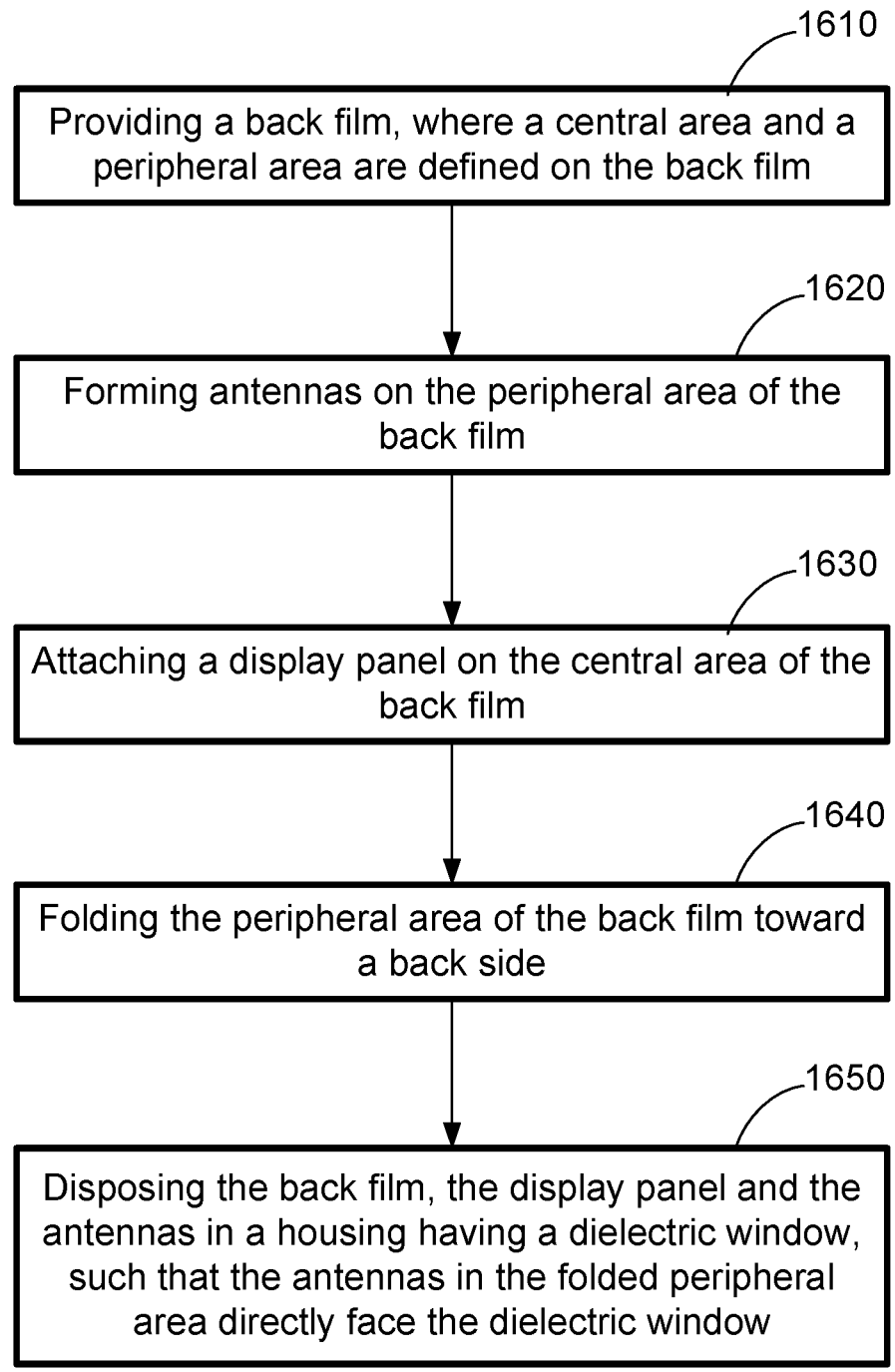
FIG. 16 shows a flowchart of forming a display device structure according to certain embodiments of the present disclosure.

In a further aspect of the disclosure, a method of forming a display device structure is provided. FIG. 16 shows a flowchart of forming a display device structure according to certain embodiments of the present disclosure. In certain embodiments, the method as shown in FIG. 16 may be implemented to form a display device structure in any of the embodiments as described above. It should be particularly noted that, unless otherwise stated in the present disclosure, the steps of the method may be arranged in a different sequential order, and are thus not limited to the sequential order as shown in FIG. 16.

As shown in FIG. 16, in step 1610, a back film is provided, where a central area and a peripheral area are defined on the back film. In step 1620, one or more antennas are formed on the peripheral area of the back film. In certain embodiments, each of the antennas may be a 5G antenna or a NFC antenna. In certain embodiments, each of the antennas may be a microstrip antenna, a probe antenna or an aperture-coupled antenna. In step 1630, a display panel is attached on the central area of the back film. In step 1640, the peripheral area of the back film is folded toward a back side. Once the peripheral area is folded, in step 1650, the back film, the display panel and the antennas are altogether disposed in a housing having a dielectric window, such that each of the antennas in the folded peripheral area directly faces the dielectric window, thus forming the display device structure.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A display device structure, comprising:
a back film;
a display panel attached on the back film, defining a central area and a peripheral area on the back film; and
at least one antenna disposed on the peripheral area of the back film, wherein the at least one antenna comprises a 5G antenna;
wherein the peripheral area of the back film is folded toward a back side of the display device structure, such that each of the at least one antenna disposed on the folded peripheral area directly faces a dielectric window.

2. The display device structure of claim 1, further comprising a housing having two side surfaces, wherein the back film, the display panel and the at least one antenna are disposed in the housing, and the dielectric window is provided on at least one of the two side surfaces of the housing, such that each of the at least one antenna corresponds to the dielectric window.

3. The display device structure of claim 1, further comprising an adhesive layer disposed between the back film and the display panel.

4. The display device structure of claim 1, wherein the back film is made of a liquid crystal polymer (LCP) material.

5. The display device structure of claim 1, wherein the display panel is a flexible display panel extending into the peripheral area, and the display panel is folded together with the peripheral area of the back film.

6. The display device structure of claim 1, wherein a width of the peripheral area of the back film is greater than one fourth of a wavelength of each of the at least one antenna.

7. The display device structure of claim 1, wherein the back film has a grounding layer insulated from the at least one antenna, and the grounding layer is disposed only in the peripheral area of the back film.

8. The display device structure of claim 1, wherein each of the at least one antenna is a microstrip antenna, a probe antenna or an aperture-coupled antenna.

9. The display device structure of claim 1, comprising a plurality of antennas, wherein all of the antennas are electrically connected to a control integrated circuit (IC) disposed in the peripheral area of the back film, such that the control IC controls each of the antennas.

10. The display device structure of claim 1, wherein each of the at least one antenna has a feeding line extending into the central area of the back film.

11. The display device structure of claim 10, further comprising a shielding layer disposed between the back film and the display panel, wherein the shielding layer is made of an electrical conductive material, and the shielding layer covers the feeding line of each of the at least one antenna along a vertical direction substantially perpendicular to the display panel.

12. The display device structure of claim 10, wherein the feeding line is overlapped with a grounding pattern layer of the display panel to avoid electro-magnetic interference of the at least one antenna.

13. A display device structure, comprising:
a back film;
a display panel attached on the back film, defining a central area and a peripheral area on the back film, wherein the display panel is a flexible display panel extending into the peripheral area; and
at least one antenna disposed on the peripheral area of the back film;
wherein the peripheral area of the back film is folded toward a back side of the display device structure, and the display panel is folded together with the peripheral area of the back film, such that each of the at least one antenna disposed on the folded peripheral area directly faces a dielectric window.

14. The display device structure of claim 13, further comprising a housing having two side surfaces, wherein the back film, the display panel and the at least one antenna are disposed in the housing, and the dielectric window is provided on at least one of the two side surfaces of the housing, such that each of the at least one antenna corresponds to the dielectric window.

15. The display device structure of claim 13, further comprising a shielding layer disposed between the back film and the display panel, wherein each of the at least one antenna has a feeding line extending into the central area of the back film, the shielding layer is made of an electrical conductive material, and the shielding layer covers the feeding line of each of the at least one antenna along a vertical direction substantially perpendicular to the display panel.

16. The display device structure of claim 13, wherein each of the at least one antenna has a feeding line extending into the central area of the back film, and the feeding line is overlapped with a grounding pattern layer of the display panel to avoid electro-magnetic interference of the at least one antenna.

* * * * *